United States Patent [19]
Fiala et al.

[11] Patent Number: 5,918,909
[45] Date of Patent: Jul. 6, 1999

[54] PACKAGE FOR CARD WITH DATA-ENCODED STRIP AND METHOD OF USING SAME

[75] Inventors: Barry J Fiala, Collierville, Tenn.; Ronald B Selby, Olive Branch, Miss.

[73] Assignee: Barry Fiala, Inc., Memphis, Tenn.

[21] Appl. No.: 08/895,283

[22] Filed: Jul. 16, 1997

Related U.S. Application Data

[63] Continuation-in-part of application No. 08/711,814, Sep. 10, 1996, abandoned, which is a continuation-in-part of application No. 08/634,820, Apr. 19, 1996, abandoned.

[51] Int. Cl.⁶ .................................................. B42D 15/00
[52] U.S. Cl. .................................. 283/61; 283/62; 283/67
[58] Field of Search ............................ 283/904, 72, 74, 283/56, 67; 206/461, 471, 495, 806; 379/144; 235/380

[56] References Cited

U.S. PATENT DOCUMENTS

| | | |
|---|---|---|
| 1,106,058 | 8/1914 | Rand . |
| 1,979,917 | 11/1934 | Vaughn ..................... 229/72 |
| 2,616,612 | 11/1952 | Guttman ................... 229/92.8 |
| 3,116,829 | 1/1964 | Pacelli ........................ 206/78 |
| 3,294,229 | 12/1966 | McConnell et al. ....... 206/57 |
| 3,692,233 | 9/1972 | Carter, Jr. ..................... 27/4 |
| 3,695,422 | 10/1972 | Tripodi ....................... 206/47 |
| 4,345,393 | 8/1982 | Price et al. ................. 40/312 |
| 4,375,850 | 3/1983 | Smyth et al. .............. 206/387 |
| 4,430,843 | 2/1984 | Favale ........................ 53/410 |
| 4,650,074 | 3/1987 | Vosbikian ................. 206/477 |
| 4,711,347 | 12/1987 | Drexler et al. .............. 75/28 |
| 4,722,376 | 2/1988 | Rhyner ........................ 11/18 |
| 4,887,763 | 12/1989 | Sano .......................... 229/71 |
| 4,896,027 | 1/1990 | Drexler ..................... 235/488 |
| 5,181,744 | 1/1993 | Betheil ...................... 283/56 |
| 5,217,056 | 6/1993 | Ritter ........................ 150/147 |
| 5,281,799 | 1/1994 | McIntire et al. . |
| 5,390,794 | 2/1995 | Vulpitta ................. 206/459.1 |
| 5,399,021 | 3/1995 | Litt ............................. 383/5 |
| 5,427,832 | 6/1995 | Longtin ...................... 428/40 |
| 5,494,544 | 2/1996 | Hill et al. . |
| 5,506,395 | 4/1996 | Eppley .......................... 7/8 |
| 5,511,114 | 4/1996 | Stimson et al. . |
| 5,577,109 | 11/1996 | Stimson et al. . |
| 5,593,075 | 1/1997 | Schumer ................. 224/483 |
| 5,629,977 | 5/1997 | Fonseca . |
| 5,640,447 | 6/1997 | Fonseca .................. 379/144 |
| 5,673,309 | 9/1997 | Woynoski et al. ....... 379/144 |
| 5,740,915 | 4/1998 | Williams ................. 206/555 |
| 5,760,381 | 6/1998 | Stich et al. . |
| 5,777,305 | 7/1998 | Smith et al. ............. 235/380 |

OTHER PUBLICATIONS

GE Capital Company Prepaid Calling Card (date unknown).
"Retail Realities," *Telecard World*, Apr. 1996 (six pages).
Front and back of Rand McNally pre–paid phone card package, 1996.
Creative South pre–paid phone card package, 1996.

*Primary Examiner*—Willmon Fridie, Jr.
*Attorney, Agent, or Firm*—Walker, McKenzie & Walker, P.C.

[57] ABSTRACT

The present invention comprises a method of activating a metered account that is associated with a personal identification number, where the personal identification number is affixed to a card and the metered account is activated at the time of sale of the card, and an apparatus comprising a package adapted for holding the card so that the method of the present invention can be practiced. The card includes an exposed data-encoded strip and the card preferably has a personal identification number thereon. The package includes a first panel and a retainer that secures the card to the first panel so that, when the card is secured to the panel, at least a portion of the data-encoded strip is exposed and laterally displaced remote from the panel. The data-encoded strip is encoded with a control number that is associated with the metered account. When the card is purchased, the control number is read from the data-encoded strip while the card is secured to the first panel, and the metered account is activated.

38 Claims, 9 Drawing Sheets

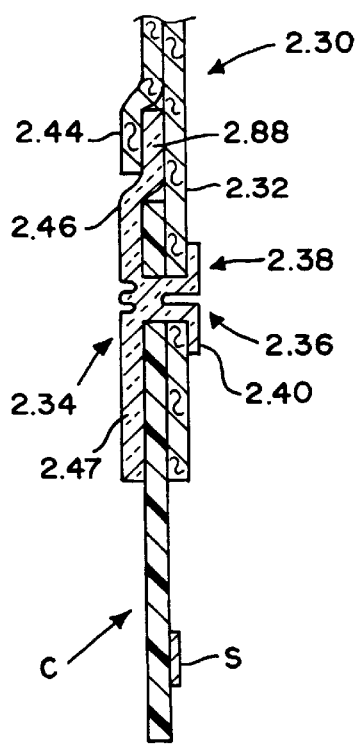
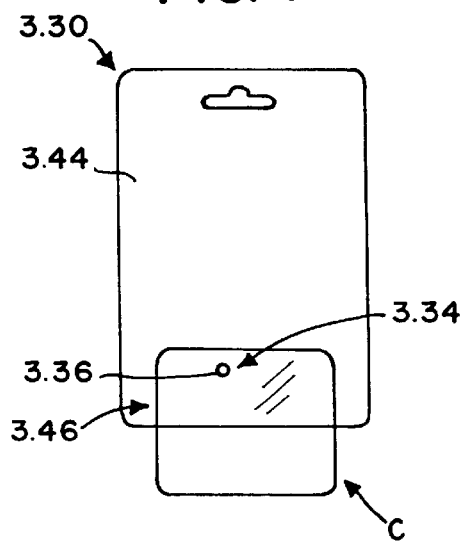
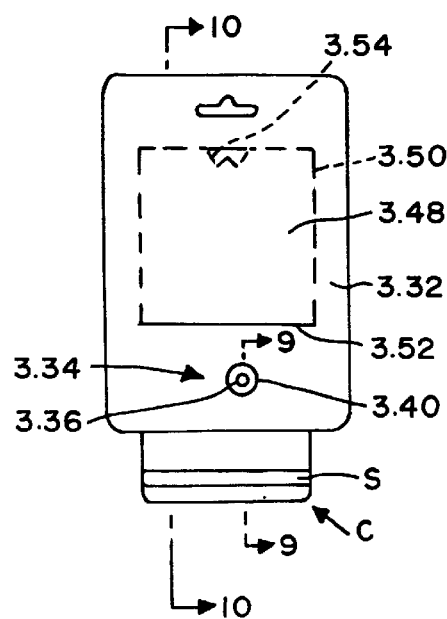

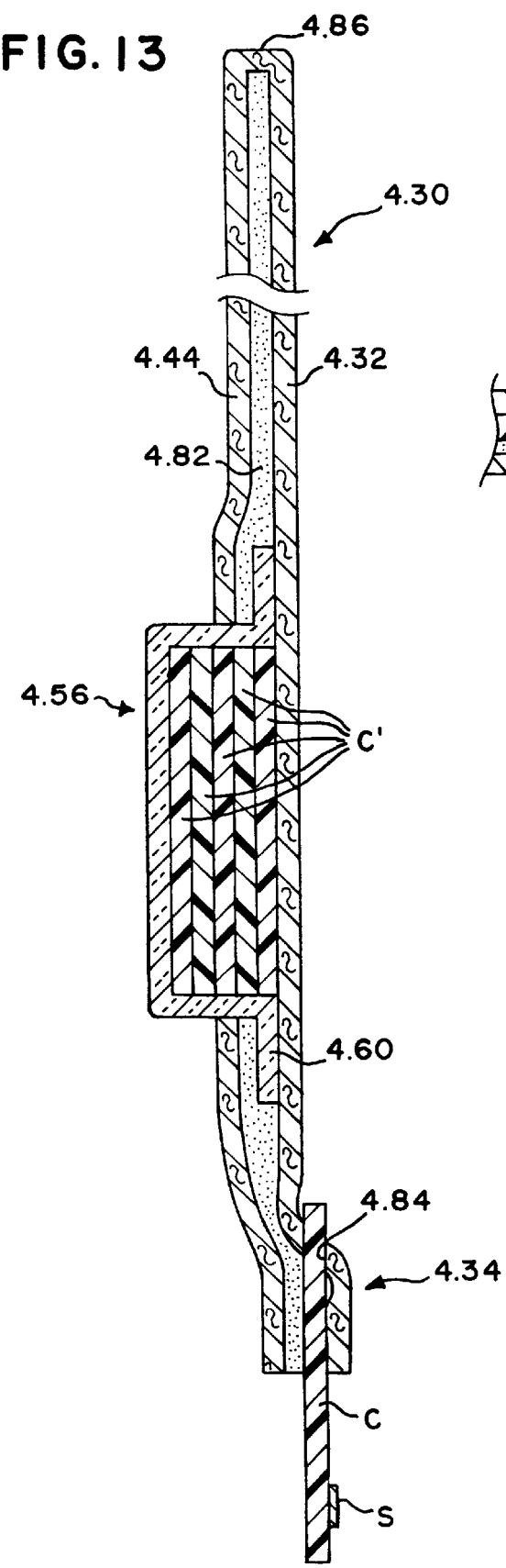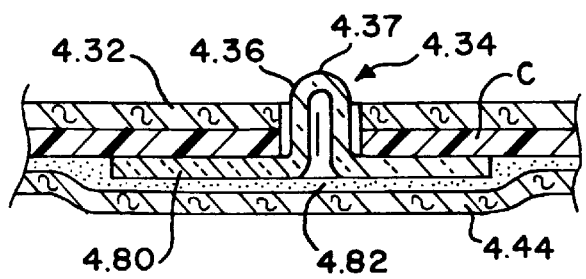

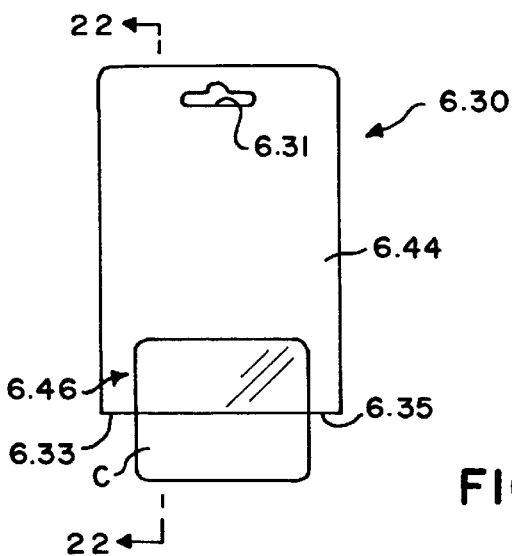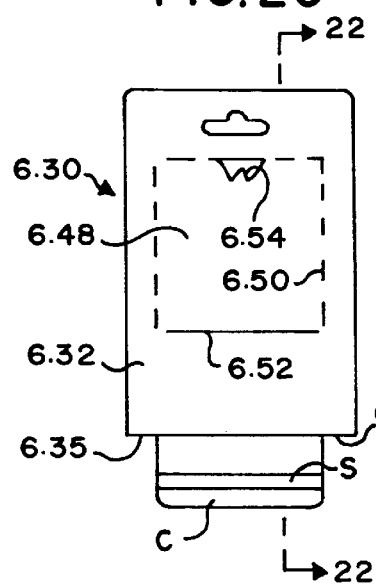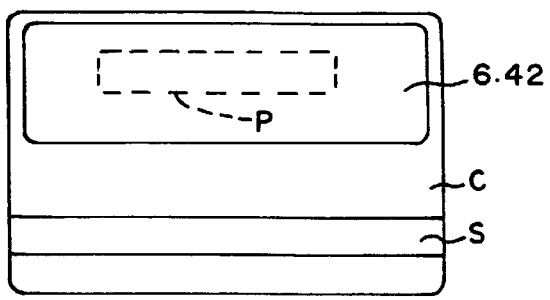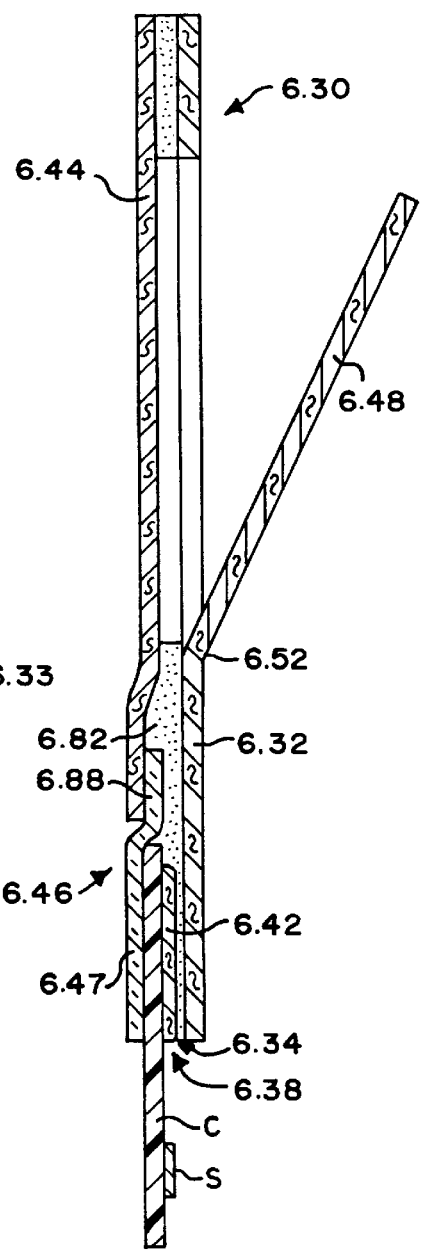

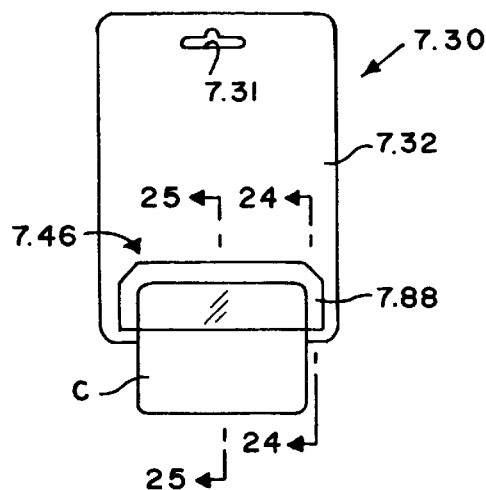
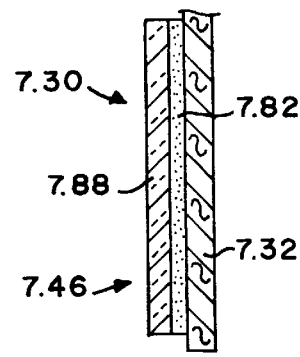
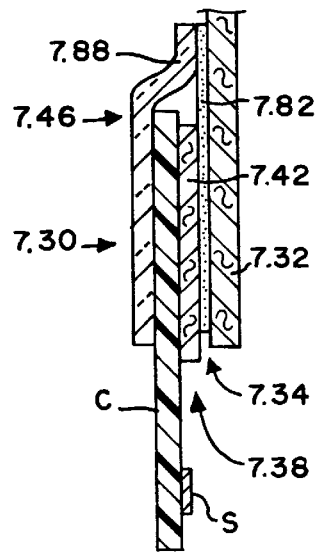
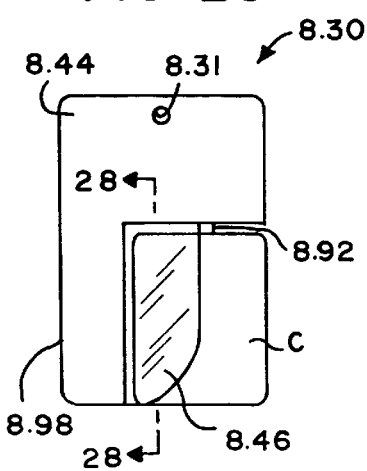
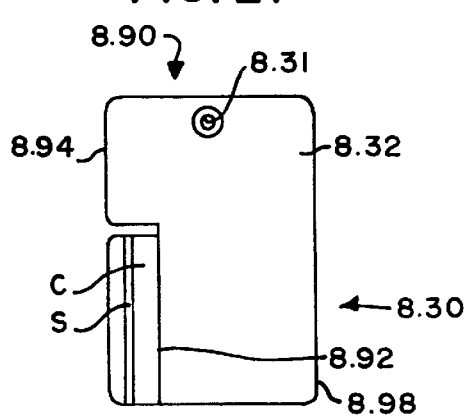

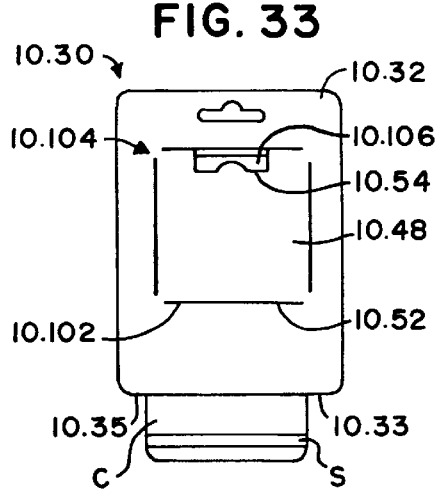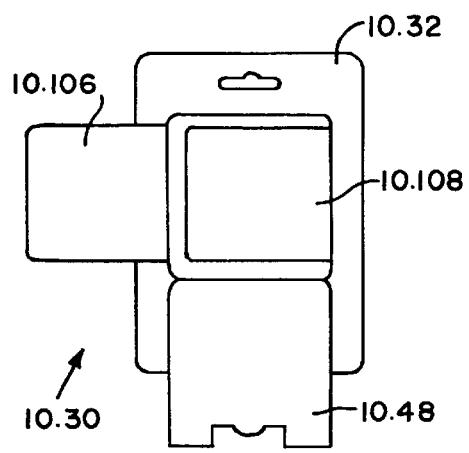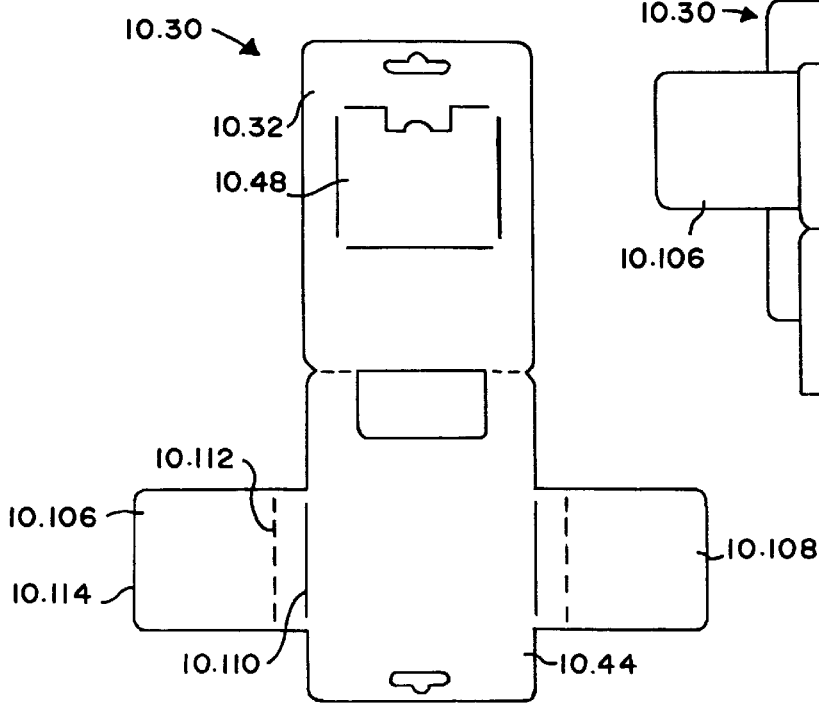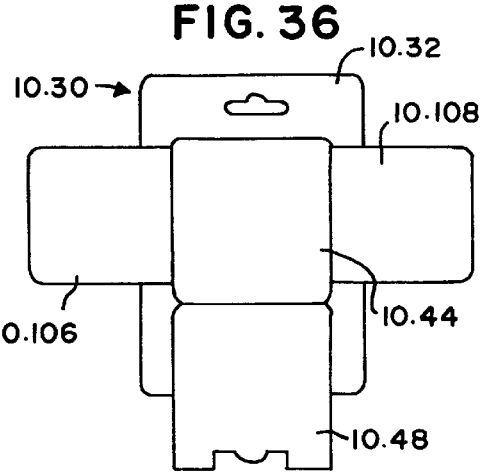

PACKAGE FOR CARD WITH DATA-ENCODED STRIP AND METHOD OF USING SAME

CROSS REFERENCE TO RELATED APPLICATIONS

This application is a continuation-in-part of now-abandoned U.S. application Ser. No. 08/711,814, filed Sep. 10, 1996, for a Package for Card with Data-Encoded Strip and Method of Using Same, which is a continuation-in-part of now-abandoned U.S. application Ser. No. 08/634,820, filed Apr. 19, 1996, for a Package for Card with Data-Encoded Strip and Method of Using Same.

STATEMENT REGARDING FEDERALLY SPONSORED RESEARCH OR DEVELOPMENT

Not applicable.

REFERENCE TO A "MICROFICHE APPENDIX"

Not applicable.

BACKGROUND OF THE INVENTION

1. Field of the Invention

The present invention relates, in general, to packaging for well-known prepaid debit cards. Such debit cards are associated with a prepaid metered account, and the account is debited as purchases are made by a consumer. In particular, the present invention relates to a package for holding a data-encoded card associated with a metered account and a method of using the package and card combination to activate the metered account with a certain predetermined value at the time of purchase of the card and package combination.

2. Information Disclosure Statement

Prior art prepaid metered accounts associated with debit cards are well-known for providing access to goods and services, e.g., telephone services. Typically, a card having a personal identification number ("PIN") thereon is sold at a retail outlet for a certain price. This PIN number is associated with an already-activated metered account that is pre-credited with a certain predetermined value representing the value of services, e.g., telephone services, being purchased. Then, as the cardholder uses the telephone services, the cardholder provides the PIN number and the account is successively debited for the services provided until the value of the card is exhausted. Often, the predetermined value credited to the metered account may be more than the actual purchase price of the debit card because of promotional pricing, etc.

However, theft of services is a problem when such a scheme is used because unfettered access to the metered account is available to anyone who obtains knowledge of the PIN number for the pre-activated metered account, necessitating the storage of such cards under lock and key by the retail merchant until the moment the cards are sold, thereby preventing the stocking of such cards on store shelves freely accessible by prospective purchasers.

A preliminary patentability search in Class 206, subclass 439.5, and Class 40, subclass 312, produced the following patents, some of which may be relevant to the present invention: Guttman, U.S. Pat. No. 2,616,612, issued Nov. 4, 1952; Tripodi, U.S. Pat. No. 3,695,422, issued Oct. 3, 1972; Price et al., U.S. Pat. No. 4,345,393, issued Aug. 24, 1982; Sano, U.S. Pat. No. 4,887,763, issued Dec. 19, 1989; Betheil, U.S. Pat. No. 5,181,744, issued Jan. 26, 1993; Litt, U.S. Pat. No. 5,399,021, issued Mar. 21, 1995; and Longtin, U.S. Pat. No. 5,427,832, issued Jun. 27, 1995.

Additionally, applicants are aware of a package of unknown date manufactured by the GE Capital Company and sold under the service mark "GE EXCHANGE" (part number 992439), holding a Montgomery Ward prepaid calling card for telephone services. The package appears to have a magnetic strip thereon for use in activating a metered account at the cash register where the card is purchased, and the prepaid calling card has a hidden PIN number, observable upon opening the package, for use in accessing the activated metered account. The card also has an identification number visible through an opening in the package. However, this prepaid calling card package scheme has problems because a particular card must be matched to a particular package's magnetic strip, and this correlation between card and package is difficult to ensure during manufacture.

None of these references, either singly or in combination, disclose or suggest the present invention.

It is therefore desirable to have a package for holding a data-encoded card and a method of using same to activate a metered account associated with said card at the time of purchase of the card.

BRIEF SUMMARY OF THE INVENTION

The present invention comprises a method of activating a metered account that is associated with a personal identification number ("PIN"), where the PIN number is displayed on a first card and the metered account is activated at the time of sale of the first card, and the invention further comprises a package adapted for holding the first card so that the method of the present invention can be practiced. The first card includes an exposed data-encoded strip and the first card preferably has the PIN number displayed thereon. The package includes a first panel and retaining means for securing the first card to the first panel so that, when the first card is secured to the first panel, at least a portion of the data-encoded strip is exposed and laterally displaced remote, preferably external, from the first panel. When the first card is secured to the first panel, the data-encoded strip can be read directly from the first card without removing the card from the package, and the metered account is activated at the time of sale of the first card.

It is an object of the present invention to provide a method of activating a metered account associated with a PIN number that is displayed on a first card, where the metered account is activated at the time of sale of the first card, where the first card need not be removed from its package to activate the account, and where a particular first card does not have to be correlated with a particular package.

It is another object of the present invention to provide a method of activating a first metered account together with at least one second metered account, the first metered account being associated with a first PIN number that is displayed on a first card, and each of the second metered accounts being associated with a respectively different particular PIN number from the first PIN number and respectively different from each other PIN number that is displayed on each other second card, where the cards are sold together in a single package, where the plurality of metered accounts are all activated at the time of sale of the cards, where the cards need not be removed from their package to activate the accounts, and where a particular first card does not have to be correlated with a particular package.

It is another object of the present invention to provide a package for holding a first card so that, when the first card is held by the package, at least a portion of a data-encoded strip on the first card is exposed and laterally displaced remote, preferably external, from the package so as to allow reading of the data-encoded strip by an appropriate reading apparatus.

It is another object of the present invention to provide a package that obscures from view a PIN number displayed on a prepaid debit card and includes a tamper evident device to indicate whether someone has attempted to view the PIN number on the card.

It is another object of the present invention to provide a package that provides for inclusion of instructions and/or advertising.

It is a further object of the present invention to provide a package for holding a first card and at least one second card so that, when the first and second cards are held by the package, a data-encoded strip on the first card is exposed and laterally displaced remote from the package so as to allow reading of the data-encoded strip by an appropriate reading apparatus.

BRIEF DESCRIPTION OF THE SEVERAL VIEWS OF THE DRAWING

FIG. 6 is a partial sectional view of the second preferred embodiment of the present invention taken substantially along the line 6—6 of FIG. 5.

FIG. 7 is a front view of a third preferred embodiment of the present invention.

FIG. 8 is a rear view of the third preferred embodiment of the present invention.

FIG. 13 is a sectional view of the fourth preferred embodiment of the present invention taken substantially along the line 13—13 of FIG. 12.

FIG. 14 is a partial sectional view of the fourth preferred embodiment of the present invention taken substantially along the line 14—14 of FIG. 12.

FIG. 19 is a front view of a sixth preferred embodiment of the present invention.

FIG. 20 is a rear view of the sixth preferred embodiment of the present invention.

FIG. 21 is a rear view of a first card showing a data-encoded strip, a personal identification number and an obscuring sticker of the sixth preferred embodiment thereover.

FIG. 22 is a sectional view of the sixth preferred embodiment of the present invention taken substantially along the line 22—22 of FIGS. 19 and 20.

FIG. 23 is a front view of a seventh preferred embodiment of the present invention.

FIG. 24 is a partial sectional view of the seventh preferred embodiment of the present invention taken substantially along the line 24—24 of FIG. 23.

FIG. 25 is a partial sectional view of the seventh preferred embodiment of the present invention taken substantially along the line 25—25 of FIG. 23.

FIG. 26 is a front view of an eighth preferred embodiment of the present invention.

FIG. 27 is a rear view of the eighth preferred embodiment of the present invention.

FIG. 33 is a rear view of the tenth preferred embodiment of the present invention.

FIG. 34 is a view of the tenth preferred embodiment of the present invention before it has been assembled.

FIG. 35 is a rear view of the tenth preferred embodiment of the present invention showing a first and a second door panel opened along their respective hinges.

FIG. 36 is a rear view of the tenth preferred embodiment of the present invention showing a first, a second, and a third door panel opened along their respective hinges.

DETAILED DESCRIPTION OF THE INVENTION

Referring to FIGS. 1–36, the present invention is seen to comprise a package for holding a data-encoded card associated with a metered account, and a method of using the package and card combination to activate the metered account, at the time of purchase of the card and package combination, with a certain predetermined value. The metered account is associated with a personal identification number ("PIN") P displayed on a first card C. Once activated, the metered account is credited with a certain predetermined balance, and any person having the correct PIN number P can subsequently be provided with goods or services having a total value up to the value of the certain predetermined balance simply by providing the PIN number each time a transaction is desired.

Figure 1:
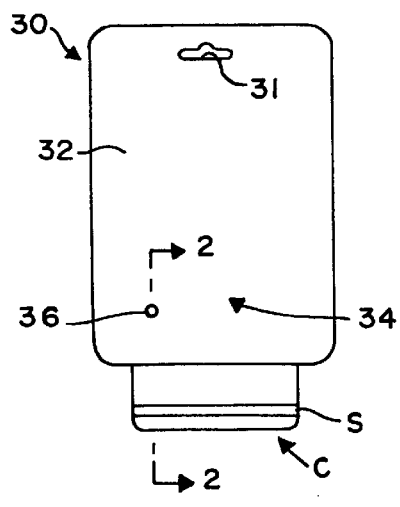
FIG. 1 is a rear view of a first embodiment of the present invention showing a package secured to a first card having an exposed data-encoded strip.
Figure 2:
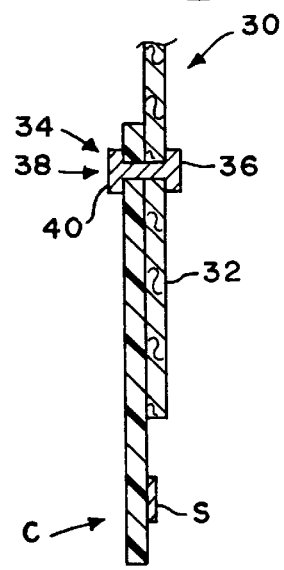
FIG. 2 is a partial sectional view of the first preferred embodiment of the present invention taken substantially along the line 2—2 of FIG. 1.
Figure 3:
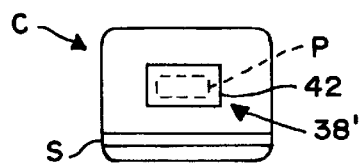
FIG. 3 is a rear view of a first card showing a data-encoded strip, a personal identification number and an obscuring sticker thereover.

Referring to FIGS. 1–3, a first preferred embodiment of the present invention is seen to comprise a package 30 adapted for holding the first card C. If desired, package 30, like all embodiments of the package of the present invention, may have an opening 31 therethrough for hanging package 30 upon a display rack in a retail store. The package 30 is constructed so that the package 30 can be separately manufactured without including the first card C and so that a subsequent manufacturing step can secure the first card C to the package 30. As shown in FIG. 3, the first card C has an exposed data-encoded strip S. The data-encoded strip can be a well-known magnetic strip encoding the data into magnetic flux reversals, a strip of well-known bar codes, a strip of well-known machine-readable optical characters, or any other well known manner of encoding data into machine-readable form as will now be apparent to those skilled in the art, and it shall be understood that these and other varieties of data-encoded strips could be substituted without departing from the spirit and scope of the present invention.

First card C may also have a PIN number P displayed thereon. The PIN number P, represented schematically in FIG. 3 by a dashed rectangle portion, can comprise any sequence of the digits 0–9, for example, the six digit sequence 987654, or may additionally or instead have a sequence of characters such as the six character sequence ABCDEF. Preferably, the PIN number P would be a very long sequence of digits and/or characters to ensure uniqueness and to inhibit guessing of the PIN number by a thief who otherwise could gain unauthorized access to the funds in the metered account.

The package 30 includes a first panel 32 and retaining means 34 for securing the first card C to the first panel 32 so that, when the first card C is secured to the first panel 32, at least a portion of the data-encoded strip S is exposed and laterally displaced remote, preferably external, from the first panel 32. Such a structure enables the data-encoded strip S on the first card C to be read by a well-known data-encoded strip reader 70 (see FIG. 18) while the first card C is still secured to the first panel 32 and without first necessitating removal of the first card C from the package 30. Retaining means 34 preferably removably secures the first card C to the first panel 32 so that, after purchase, a purchaser could easily remove the first card C from the package 30 and store the first card C in a convenient place such as a wallet or purse. Because the metered account is not activated until the card and package combination is purchased, theft of the card and package combination by a shoplifter does not result in access to funds in the metered account.

While retaining means 34 could comprise a well-known rubberized glue so that card C could be peelably removed from card C, instead, referring to FIG. 2, retaining means 34 preferably comprises one or more rivets 36. The rivet 36 preferably extends through a hole in the first card C, but may extend through a notch (not shown) on one or more side edges of the first card C. For example, two rivets 36 may be used with each one respectively extending through a notch on an opposite edge of the first card C. The cross section of the rivet 36 is preferably circular, but may be rectangular, polygonal, or any other shape as will now be apparent to those skilled in the art. The rivet 36 is preferably constructed from synthetic resin materials such as, for example, well-known poly vinyl chloride ("PVC") materials, but can be made from plastic or metal or other suitable well-known equivalent substantially-rigid material as will now be apparent to those skilled in the art.

When the first card C has a PIN number P displayed thereon, it is desirable to obscure the PIN number P from view because any person knowing the PIN number P will have access to the metered account once the account has been activated. For example, if a thief were able to collect the PIN numbers for several metered accounts before purchase activation of those accounts, the thief would simply have to wait until the card and package combination was purchased by an unsuspecting purchaser and the account was activated, and then the thief could surreptitiously drain the account of its funds by using its associated PIN to purchase goods and services.

Accordingly, retaining means 34 preferably secures the first card C to the first panel 32 so that the PIN number P is obscured from view while the first card C is secured to the first panel 32. Preferably, the rivet 36 and the first card C are positioned so that, when the rivet 36 secures the first card C to the first panel 32, the PIN number P is held against the first panel 32 and is thereby obscured from view. There is a danger, however, that the PIN number P could still be viewed by slightly prying the first card C away from the first panel 32 while the first card C remains secured to the first panel 32. Therefore, it is desirable to provide means for detecting when the PIN number P has been surreptitiously viewed so that the associated metered account can be prevented from being activated.

The rivet 36 thus preferably comprises tamper evident means 38 for indicating that a surreptitious attempt has been made to view the PIN number P when the first card C is secured to the first panel 32. Tamper evident means 38 can be constructed in many ways but preferably comprises a circumferential lip or flange 40 radially extending from one or both ends of the rivet. The outer edge of the flange 40 is preferably circular, but may be any shape, and flange 40 is constructed so that the flange 40 will permanently deform if a person surreptitiously tries to pry the first card C away from the first panel 32, thus giving an indication that an improper attempt was made to view the PIN number P.

Alternately, the card and package combination may comprise tamper evident means 38' for indicating that an attempt has been made to view the PIN number P when the first card C is secured to the first panel 32. As shown in FIG. 3, tamper evident means 38' may comprise a sticker 42 preferably obscuringly but removably attached on top of the PIN number P on the first card C. The sticker 42 is constructed so that, when an attempt is made to detach the sticker 42 to view the PIN number P, the sticker 42 will either break or crack or deform or curl or will detach from the first card C and will not be re-attachable, thus giving an indication that a surreptitious attempt was made to view the PIN number P. Alternatively, the sticker 42 may be attached both to the back of the first card C and to the back of the first panel 32.

Figure 4:
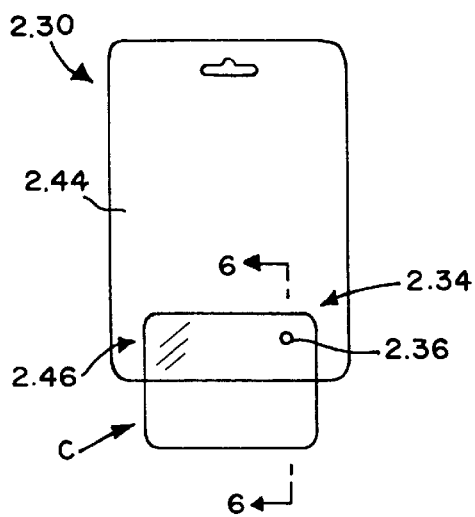
FIG. 4 is a front view of a second preferred embodiment of the present invention.
Figure 5:
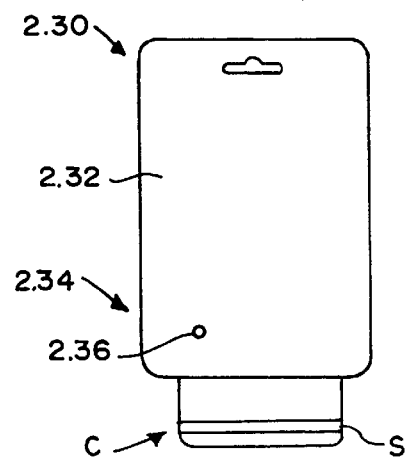
FIG. 5 is a rear view of the second preferred embodiment of the present invention.

A second preferred embodiment is shown in FIGS. 4–6. FIG. 4 shows a front view, FIG. 5 shows a rear view, and FIG. 6 shows an enlarged partial sectional view taken substantially along the line 6—6 of FIG. 4. Identifying reference designators for this second embodiment are marked similarly to the first embodiment, except with the prefix "2.". It shall be understood that many aspects of the two embodiments are substantially the same, and only the differences will be treated in detail, it being understood that similar structural features of the two embodiments perform similar functions.

The second embodiment comprises a package 2.30 adapted for holding a first card C, and package 2.30 preferably includes a first panel 2.32; retaining means 2.34 for securing the first card C to the first panel 2.32 so that, when the first card C is secured to the first panel 2.32, at least a portion of the data-encoded strip S is exposed and laterally displaced remote, preferably external, from the first panel 2.32; and a second panel 2.44 adapted for attachment in congruent alignment with the first panel 2.32. The second panel 2.44 is adapted to retain the first card C between the first 2.32 and the second 2.44 panels when the first card C is secured to the first panel 2.32. The second preferred embodiment may also comprise tamper evident means as heretofore described. For example, retaining means 2.34 preferably comprises a rivet 2.36 preferably constructed integral, one piece with pane 2.47, hereinafter described, with rivet 2.36 being preferably formed, for example, by heating and deforming pane 2.47 through aligned apertures in card C and panel 2.32, and retaining means 2.34 preferably includes tamper evident means 2.38 comprising a flange 2.40 that extends radially from rivet 2.36 and meltingly formed therefrom, with flange 2.40 being non-restoringly deformable if panel 2.32 is pried up from card C to surreptitiously view the PIN number that is obscured by panel 2.32 as heretofore described.

Referring to FIG. 6, the second panel 2.44 preferably comprises a substantially transparent window portion 2.46 positioned to overlap a portion of the first card C remote from the data-encoded strip S when the first card C is secured to the first panel 2.32. The transparent window portion 2.46 is preferably constructed of a pane 2.47 made from synthetic resin materials such as, for example, well-known poly vinyl chloride ("PVC") materials, but can be made from transparent plastic or any other suitable well-known equivalent material as will now be apparent to those skilled in the art. The overall dimensions of pane 2.47 are greater than the dimensions of the overlapped portion of the first card C, and the non-overlapping lip or flange portion 2.88 of pane 2.47 is preferably glued between the first 2.32 and second 2.44 panels. Preferably, first and second panels 2.32 and 2.44 are coated on their inner surfaces with glue, such as, for example, well-known PVC glue, and first panel 2.32 is gluingly sealed to second panel 2.44 in a manner well-known to those skilled in the art by the application of heat and pressure, causing the PVC glue to meltingly join the two panels and pane 2.47 together. Alternatively, panels 2.32 and 2.44 could be pre-coated with a well-known polyethylene coating, which is then similarly heated to bond the panels together under pressure in a manner well-known to those skilled in the art. As heretofore noted, rivet 2.36 is preferably constructed integral, one-piece with the pane 2.47, as, for example, by being heatedly and deformably formed from the PVC pane 2.47.

Figure 9:
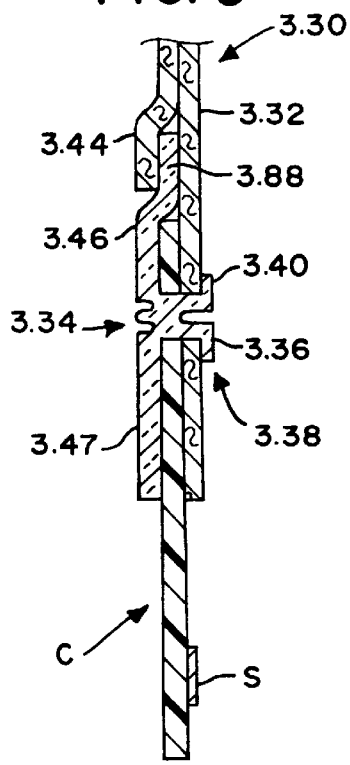
FIG. 9 is a partial sectional view of the third preferred embodiment of the present invention taken substantially along the line 9—9 of FIG. 8.
Figure 10:
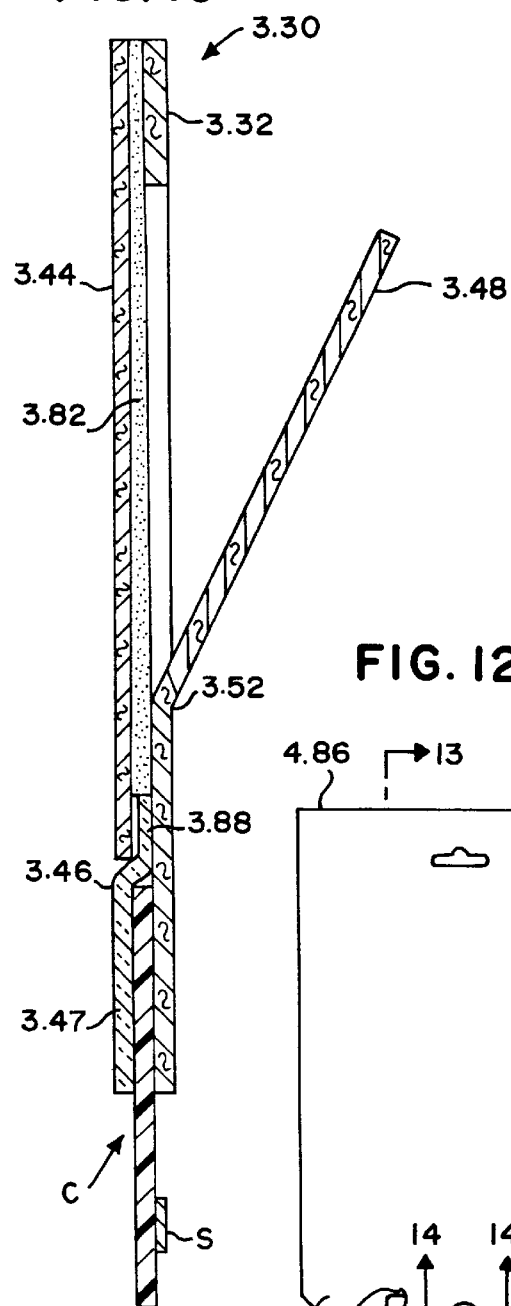
FIG. 10 is a sectional view of the third preferred embodiment of the present invention taken substantially along the line 10—10 of FIG. 8.

A third preferred embodiment is shown in FIGS. 7–10. FIG. 7 shows a front view, FIG. 8 shows a rear view, FIG. 9 shows an enlarged partial sectional view taken substantially along the line 9—9 of FIG. 8, and FIG. 10 shows an enlarged sectional view taken substantially along the line 10—10 of FIG. 8. Identifying reference designators for the third embodiment are marked similarly to the other embodiments, except with the prefix "3.". It shall be understood that many aspects of all embodiments are substantially the same, and only the differences will be treated in detail, it being understood that similar structural features of all the embodiments perform similar functions.

The third preferred embodiment comprises a package 3.30 adapted for holding a first card C, and package 3.30 includes: a first panel 3.32, retaining means 3.34 for securing the first card C to the first panel 3.32 so that, when the first card C is secured to the first panel 3.32, at least a portion of the data-encoded strip S is exposed and laterally displaced remote, preferably external, from the first panel 3.32, and a second panel 3.44 adapted to be attached in congruent alignment with the first panel 3.32. The first panel 3.32 may comprise a door panel 3.48 movably attached to the first panel 3.32. The door panel 3.48 is preferably constructed integral, one-piece with the first panel 3.32. While door panel 3.48 may include perforations along all four edges so that the door panel 3.48 would be removably attached to the first panel 3.32, door panel 3.48 is instead preferably constructed as shown to include perforations 3.50 along three edges and a formed hinge 3.52 along one edge, hingedly attaching the door panel 3.48 to the first panel 3.32. Referring to FIGS. 8 and 10, the door panel 3.48 may include a finger recess cutout 3.54 to assist in opening the door panel 3.48 by permitting the insertion of a person's finger therewithin for better grip of the upper edge of door panel 3.48. Printed material, such as advertisements, coupons, instructions, etc., located on or between the second panel 3.44 and the door panel 3.48, may be accessed once the door panel 3.48 is opened. The package 3.30 may comprise a transparent window portion 3.46 as previously described in the discussion of the second preferred embodiment.

Referring to FIG. 9, the third preferred embodiment preferably includes a transparent window portion 3.46 and retaining means 3.34 comprising a rivet 3.36. The transparent window portion 3.46 is preferably constructed of a pane 3.47 made from synthetic resin materials such as, for example, well-known poly vinyl chloride ("PVC") materials, but could be made from transparent plastic or any other suitable well-known equivalent material as will now be apparent to those skilled in the art. The overall dimensions of pane 3.47 are greater than the dimensions of the overlapped portion of the first card C, and the non-overlapping lip or flange portion 3.88 of the transparent window portion 3.46 is preferably glued between the first 3.32 and second 3.44 panels. Preferably, first and second panels 3.32 and 3.44 are coated on their inner surfaces with glue 3.82, such as, for example, well-known PVC glue, and first panel 3.32 is gluingly sealed to second panel 3.44 in a manner well-known to those skilled in the art by the application of heat and pressure, causing the PVC glue to meltingly join the two panels and pane 3.47 together. The rivet 3.36 is preferably constructed integral, one-piece with the pane 3.47, as, for example, by being heatedly and deformably formed in the PVC pane 3.47, and preferably includes tamper evident means 3.38 comprising a flange 3.40 that extends radially from rivet 3.36, with flange 3.40 being non-restoringly deformable if panel 3.32 is pried up from card C to surreptitiously view the PIN number that is obscured by panel 3.32 as heretofore described.

Figure 11:
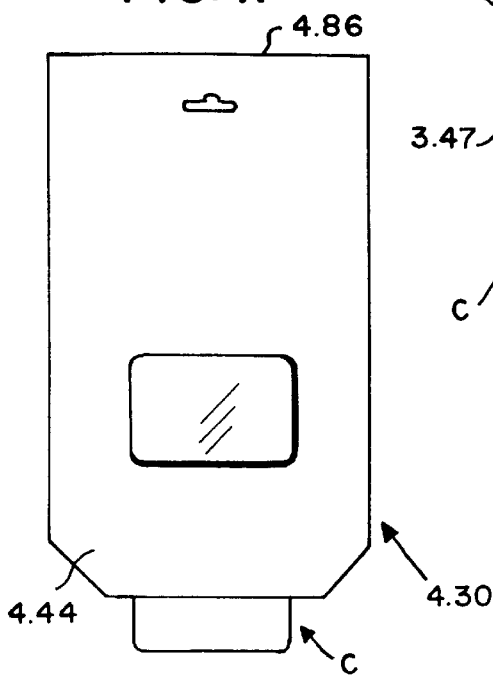
FIG. 11 is a front view of a fourth preferred embodiment of the present invention.
Figure 12:
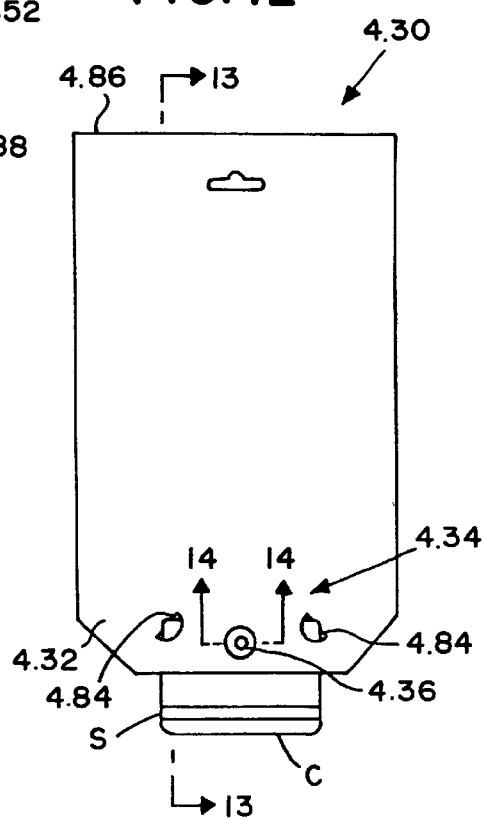
FIG. 12 is a rear view of the fourth preferred embodiment of the present invention.

A fourth preferred embodiment is shown in FIGS. 11–14. FIG. 11 shows a front view, FIG. 12 shows a rear view, FIG. 13 shows an enlarged sectional view taken substantially along the line 13—13 of FIG. 12, and FIG. 14 shows an enlarged partial sectional view taken substantially along the line 14—14 of FIG. 12. Identifying reference designators for the fourth preferred embodiment are marked similarly to the other embodiments, except with the prefix "4.". It shall be understood that many aspects of all embodiments are substantially the same, and only the differences will be treated in detail, it being understood that similar structural features of all the embodiments perform similar functions.

The fourth preferred embodiment comprises a package 4.30 adapted for holding a first card C. The package 4.30 includes a first panel 4.32, retaining means 4.34 for securing the first card C to the first panel 4.32 so that, when the first card C is secured to the first panel 4.32, at least a portion of the data-encoded strip S is exposed and laterally displaced remote, preferably external, from the first panel 4.32, and a second panel 4.44 adapted to be attached in congruent alignment with the first panel 4.32. The first 4.32 and second 4.44 panels are preferably constructed to have nearly identical outer dimensions and are preferably hingedly connected along their top edges 4.86. After the first card C is secured to the first panel 4.32, the first 4.32 and second 4.44 panels are attached, preferably with glue 4.82 in a manner similar to the previously-described embodiments. The outer dimensions of the fourth embodiment are preferably 6 inches (15.2 cm) wide by 9 inches (22.9 cm) tall.

Referring to FIG. 13, which shows the dimensions exaggerated for clarity, the second panel 4.44 is seen to comprise a retaining portion 4.56 adapted to secure at least one second card C' to the package so that the at least one second card C' is laterally displaced from the first card C. The retaining portion 4.56 is preferably transparent for viewing of the cards C' therethrough and preferably has a circumferential lip or flange 4.60 that can be secured, preferably with PVC glue 4.82, between the first 4.32 and second 4.44 panels in a manner heretofore described. The retaining portion 4.56 is preferably constructed from synthetic resin materials such as, for example, well-known poly vinyl chloride ("PVC") materials, but can be made from plastic or any other suitable well-known equivalent material as will now be apparent to those skilled in the art.

Referring to FIGS. 12–14, retaining means 4.34 preferably comprises a rivet 4.36 and two apertures 4.84 within first panel 4.32. Each aperture 4.84 secures a respective top corner of the first card C when the corners are inserted into the apertures 4.84. The rivet 4.36 is preferably constructed from a 1 inch by 1 inch (2.5 cm by 2.5 cm) sheet 4.80 made from synthetic resin materials such as, for example, well-known poly vinyl chloride ("PVC") materials, but can be made from plastic or any other suitable well-known substantially rigid equivalent material as will now be apparent to those skilled in the art. The first card C is positioned against the first panel 4.32 with the upper corners of the first card C inserted into the apertures 4.84, and the sheet 4.80 is placed on top of the first card C so that the rivet 4.36 extends through the first card C and through the first panel 4.32. If desired, the tip 4.37 of rivet 4.36 could be deformably formed into a flange (not shown) entrapping first panel 4.32, in a similar manner to that heretofore described with the second and third embodiments, so as to provide similar tamper evident means for the fourth embodiment as well. FIG. 14 shows the rivet 4.36 securing the first card C to the first panel 4.32 with the dimensions exaggerated somewhat for clarity.

Figure 15:
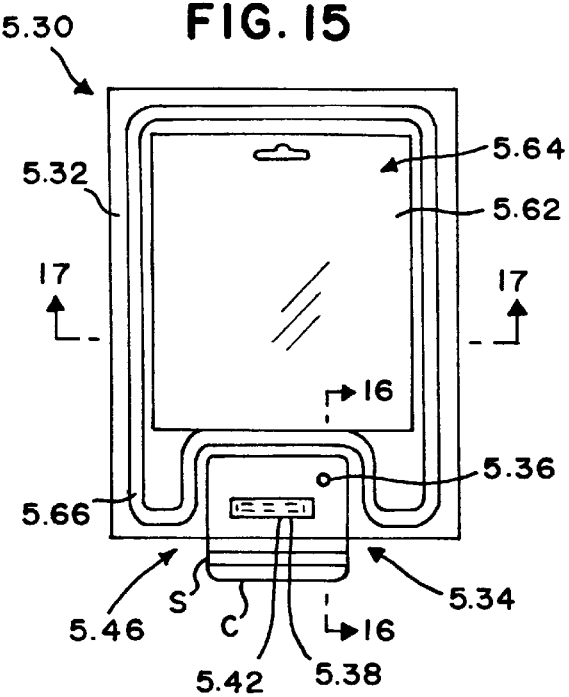
FIG. 15 is a front view of a fifth preferred embodiment of the present invention.
Figure 16:
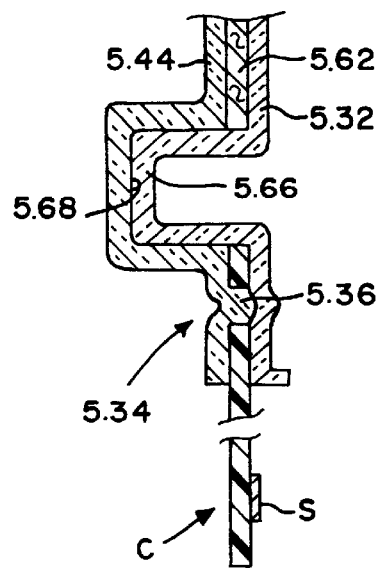
FIG. 16 is a partial sectional view of the fifth preferred embodiment of the present invention taken substantially along the line 16—16 of FIG. 15.
Figure 17:
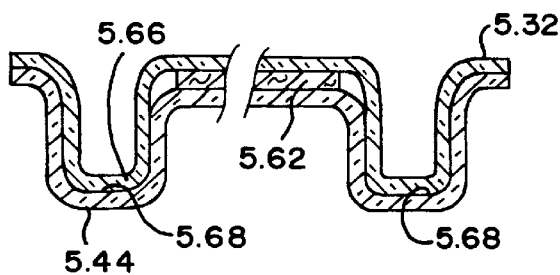
FIG. 17 is a sectional view of the fifth preferred embodiment of the present invention taken substantially along the line 17—17 of FIG. 15.

A fifth preferred embodiment is shown in FIGS. 15–17. FIG. 15 shows a rear view, FIG. 16 shows an enlarged partial sectional view taken substantially along the line 16—16 of FIG. 15, and FIG. 17 shows an enlarged sectional view taken substantially along the line 17—17 of FIG. 15. Identifying reference designators for the fifth embodiment are marked similarly to the other embodiments, except with the prefix "5.". It shall be understood that many aspects of all embodiments are substantially the same, and only the differences will be treated in detail, it being understood that similar structural features of all the embodiments perform similar functions.

The fifth preferred embodiment comprises a package 5.30 adapted for holding a first card C, and package 5.30 includes a first panel 5.32 and retaining means 5.34 for securing the first card C to the first panel 5.32 so that, when the first card C is secured to the first panel 5.32, at least a portion of the data-encoded strip S is exposed and laterally displaced remote, preferably external, from the first panel 5.32. The package 5.30 further includes a second panel 5.44 adapted to be attached in congruent alignment to the first panel 5.32 and adapted to entrap a third panel 5.62 between the first 5.32 and second 5.44 panels. The first panel 5.32 preferably includes a male flange or protuberance 5.66 and the second panel 5.44 preferably includes a mating female channel or protuberance 5.68 constructed so that the male 5.66 and female 5.68 protuberances can be matingly engaged to attach the first 5.32 and second 5.44 panels in congruent alignment. The protuberances 5.66, 5.68 may be discontinuous but preferably are continuous and act to entrap a third panel 5.62 between the first 5.32 and second 5.44 panels. FIGS. 16 and 17 exaggerate the dimensions of the protuberances 5.66, 5.68 so that they are clearly shown.

Referring to FIG. 16, the retaining means 5.34 preferably comprises a rivet 5.36 deformably extending from the second panel 5.44 and through the first card C to the first panel 5.32 and preferably being meltingly bonded thereto for securing the first card C to the first panel 5.32 so that at least a portion of the data-encoded strip S is exposed and laterally displaced remote, preferably external, from the first panel 5.32. When the first card C is secured to the first panel 5.32, the rivet 5.36 extends through the first card C and the first panel 5.32, and the rivet 5.36 is heat sealed to the first panel 5.32, thereby also providing tamper-evident means for this fourth embodiment by providing evidence, by the breaking of the heat sealed bond of rivet 5.36 to panel 5.32, of a surreptitious attempt to view the PIN number on card C. Referring to FIG. 15, the protuberances 5.66, 5.68 preferably also secure the first card C to the package 5.30 by preventing the first card C from rotating about the rivet 5.36.

Referring to FIG. 15, the second panel 5.44 has window means 5.64 for viewing the third panel 5.62 therethrough. The window means 5.64 may comprise an opening in the second panel 5.44, but preferably comprises the second panel 5.44 being constructed from a substantially transparent material. The third panel 5.62 may be imprinted with advertising, coupons, instructions, or other information as will now be apparent to those skilled in the art.

The first 5.32 and second 5.44 panels are preferably constructed from substantially transparent synthetic resin materials such as, for example, well-known poly vinyl chloride ("PVC") materials, but can be made from plastic or any other suitable well-known equivalent material as will now be apparent to those skilled in the art, and are preferably joined together as by meltingly heating or welding panels 5.32 and 5.44 one to the other. The first 5.32 and second 5.44 panels can be constructed in any size, but preferably are constructed to be 6.44 inches (16.4 cm) tall by 4.75 inches (12.1 cm) wide.

The second panel 5.44 preferably includes a transparent window portion so that the first card C can be viewed therethrough. When the first 5.32 and second 5.44 panels are constructed from PVC materials, a transparent window portion will be formed on both panels 5.32, 5.44 located adjacent the first card C and between the protuberances 5.66, 5.68. FIG. 15 shows the first panel 5.32 including a transparent window portion 5.46. Tamper evident means 5.38 preferably also comprises a sticker 5.42 which is placed on top of the PIN number P to obscure the PIN number from view.

A sixth preferred embodiment is shown in FIGS. 19–22. FIG. 19 shows a front view, FIG. 20 shows a rear view, and FIG. 22 shows an enlarged sectional view taken substantially along the line 22–22 of FIGS. 19 and 20. FIG. 21 shows a rear view of a first card C having a data-encoded strip S, a personal identification number P and an obscuring sticker of the sixth preferred embodiment thereover. Identifying reference designators for the sixth embodiment are marked similarly to the other embodiments, except with the prefix "6.". It shall be understood that many aspects of all embodiments are substantially the same, and only the differences will be treated in detail, it being understood that similar structural features of all the embodiments perform similar functions.

The sixth preferred embodiment comprises a package 6.30 adapted for holding a first card C, and package 6.30 includes: a first panel 6.32, retaining means 6.34 for securing the first card C to the first panel 6.32 so that, when the first card C is secured to the first panel 6.32, at least a portion of the data-encoded strip S is exposed and laterally displaced remote, preferably external, from the first panel 6.32, and a second panel 6.44 adapted to be attached in congruent alignment with the first panel 6.32. Preferably, first and second panels 6.32 and 6.44 are formed as a single piece of cardboard folded in the middle so as to cause panels 6.32 and 6.44 to be hingedly attached to each other along their left and right bottom edge portions 6.33 and 6.35. The first panel 6.32 may include a door panel 6.48 movably attached to the first panel 6.32. The door panel 6.48 is preferably constructed integral, one-piece with the first panel 6.32. While door panel 6.48 may include perforations along all four edges so that the door panel 6.48 would be removably attached to the first panel 6.32, door panel 6.48 is instead preferably constructed as shown to include perforations 6.50 along three edges and a formed hinge 6.52 along one edge, hingedly attaching the door panel 6.48 to the first panel 6.32. Referring to FIG. 20, the door panel 6.48 may include a finger recess cutout 6.54 to assist in opening the door panel 6.48 by permitting the insertion of a person's finger therewithin for better grip of the upper edge of door panel 6.48. Printed material, such as advertisements, coupons, instructions, etc., located on or between the second panel 6.44 and the door panel 6.48, may be accessed once the door panel 6.48 is opened.

Referring to FIGS. 19 and 22, the sixth preferred embodiment 6.30 preferably includes a transparent window portion 6.46 similar to that previously described for the second and third embodiments. The transparent window portion 6.46 is preferably constructed of a pane 6.47 made from synthetic resin materials such as, for example, well-known poly vinyl chloride ("PVC") materials, but could be made from transparent plastic or any other suitable well-known equivalent material as will now be apparent to those skilled in the art. The overall dimensions of pane 6.47 are greater than the dimensions of the overlapped portion of the first card C, and the non-overlapping lip or flange portion 6.88 of the transparent window portion 6.46 is preferably glued between the first 6.32 and second 6.44 panels and, as in the second and third embodiments, lip or flange portion 6.88 extends between first and second panels 6.32 and 6.44 at the upper, left, and right edges of card C. Preferably, first and second panels 6.32 and 6.44 are coated on their inner surfaces with glue 6.82, such as, for example, well-known PVC glue, and first panel 6.32 is gluingly sealed to second panel 6.44 in a manner well-known to those skilled in the art by the application of heat and pressure, causing the PVC glue to meltingly join the two panels and pane 6.47 together. If desired, glue 6.82 could be masked from the area between door panel 6.48 and second panel 6.44 so that the printed material, such as advertisements, coupons, instructions, etc., located on or between the second panel 6.44 and the door panel 6.48, could be more readily viewed, or preferably glue 6.82 could cover the entire inner surface of first and second panels 6.32, 6.44 and door panel 6.48, with glue 6.82 being substantially transparent so that printed material on the interior of door panel 6.48 and/or second panel 6.44 could be viewed through the thin surface coating of glue 6.82 thereon.

The significant difference between the sixth embodiment of the present invention and the other embodiments is in the structure of the retaining means 6.34, hereinafter described, for securing the first card C to the first panel 6.32 so that, when the first card C is secured to the first panel 6.32, at least a portion of the data-encoded strip S is exposed and laterally displaced remote, preferably external, from the first panel 6.32. No rivet is used in the sixth embodiment of the invention.

Referring now to FIGS. 21 and 22, the PIN number P on the reverse of card C is obscured by a peel-off label or sticker 6.42, with sticker 6.42 preferably being one inch (2.54 cm) by four inches (10.2 cm) in height and width, respectively, and having a substantial exposed surface area. Sticker 6.42 has a well-known adhesive with a well-known peel-off backing thereover so that removal of the peel-off backing allows sticker 6.42 to be adhesively attached to card C as shown in FIG. 21, with PIN number P obscured. Additionally, on its exposed side remote from card C, label 6.42 preferably has a heat-meltable glue coating such as, for example, a well-known PVC glue similar to that on the inner surfaces of first and second panels 6.32 and 6.44. As first and second panels 6.32 and 6.44 are heatedly bonded together by co-melting the PVC glue 6.82 on their inner surfaces, the heat-meltable glue coating on the exposed side of sticker 6.42 remote from card C is also co-melted with PVC glue 6.82 and adhesively mixed therewith, thereby bonding panels 6.32 and 6.44 together and simultaneously bonding sticker 6.42, and therefore also card C to which sticker 6.42 is adhesively secured, to panel 6.32. Thus, in this sixth embodiment, the sticker 6.42 performs the double structural function of obscuring the PIN number P and also, by means of glue 6.82, retaining card C to first panel 6.32. Tamper evident means 6.38 is thus seen to include sticker 6.42 affixed to card C and obscuring number P from view, and retaining means 6.34 is thus seen to include the glue 6.82 bonding sticker 6.42, and thus card C, to first panel 6.32.

Tests of prototypes of the sixth embodiment 6.30 indicate that pane 6.47 presses card C against first panel 6.32, thereby tightly securing card C to first panel 6.32 because of the substantial shearing forces parallel to the surface of first panel 6.32 necessary to break the adhesive strength of glue 6.82 bonding to the substantial surface area of sticker 6.42. However, if panel 6.32 is pried away from card C in an attempt to view the PIN number P, or if card C is similarly pried away from panel 6.32 in an attempt to view PIN number P, the adhesive bond between sticker 6.42 and glue 6.82 breaks because of the prying, rather than shearing, forces being applied, and this broken glue bond provides clear evidence of tampering with the package. Similarly, if an attempt is made to lift sticker 6.42 from card C to view the PIN number P, clear evidence will be left that the package has been tampered with, whether the evidence is the deformation, tearing, and/or lifting of sticker 6.42 from card C, or whether the evidence is the breaking of the adhesive bond between sticker 6.42 and glue 6.82 that also occurs during such tampering. Of course, a legitimate purchaser of the card C can simply pry card C from panel 6.32 and remove sticker 6.42 after the card has been activated in a manner herein described, thereby allowing the card C to be used in its intended manner. It shall also be understood that the sixth embodiment could also be adapted to include a retaining portion, not shown, for holding at least one second card and preferably a plurality of second cards in a manner similar to retaining portion 4.56 of the fourth embodiment heretofore described in detail. Like all embodiments, the sixth embodiment 6.30 preferably has an opening 6.31 therethrough for hanging the package on a display rack in a retail store.

A seventh preferred embodiment is shown in FIGS. 23–25. FIG. 23 shows a front view, FIG. 24 shows an enlarged partial sectional view taken substantially along the line 24—24 of FIG. 23, and FIG. 25 shows an enlarged sectional view taken substantially along the line 25—25 of FIG. 23. Identifying reference designators for the seventh embodiment are marked similarly to the other embodiments, except with the prefix "7.". It shall be understood that many aspects of all embodiments are substantially the same, and only the differences will be treated in detail, it being understood that similar structural features of all the embodiments perform similar functions.

The seventh preferred embodiment comprises a package 7.30 adapted for holding a first card C, and package 7.30 includes: a first panel 7.32, retaining means 7.34 for securing the first card C to the first panel 7.32 so that, when the first card C is secured to the first panel 7.32, at least a portion of the data-encoded strip S is exposed and laterally displaced remote, preferably external, from the first panel 7.32, and a transparent window portion 7.46 positioned to overlap a portion of the first card C remote from the data-encoded strip S when the first card C is secured to the first panel 7.32. Preferably, the first panel 7.32 is constructed from a single piece of cardboard and has an opening 7.31 therethrough for hanging the package 7.30 on a display rack in a retail store. Printed material, such as advertisements, coupons, instructions, etc., may be located on the front and/or back of the first panel 7.32. This seventh embodiment is less expensive to construct than most of the other embodiments because it does not require a second panel and because it requires less glue 7.82.

The transparent window portion 7.46 is constructed similar to that previously described for the sixth embodiment, the significant difference being the manner in which the non-overlapping lip or flange portion 7.88 of the transparent window portion 7.46 is attached to the first panel 7.32. Preferably, glue 7.82, such as, for example, well-known PVC glue, is applied between the first panel 7.32 and the lip or flange portion 7.88, and the lip or flange portion 7.88 is gluingly sealed to the first panel 7.32 in a manner well-known to those skilled in the art by the application of heat and pressure, causing the PVC glue to meltingly join first panel 7.32 and lip or flange portion 7.88 together.

Package 7.30 preferably includes tamper evident means 7.38 including a sticker 7.42 which is substantially identical in construction and operation as that described for the sixth embodiment. Retaining means 7.34 preferably includes glue 7.82 and sticker 7.42 which preferably has a heat meltable glue coating on its exposed side remote from first card C, substantially as described for the sixth embodiment. Glue 7.82 is preferably applied to an area of the first panel 7.32 to which the first card C is being secured, and the first card C is secured to the first panel 7.32 by co-melting the glue 7.82 and the heat meltable glue coating on the exposed side of sticker 7.42.

It shall also be understood that the seventh embodiment could also be adapted to include a retaining portion, not shown, for holding at least one second card and preferably a plurality of second cards in a manner similar to retaining portion 4.56 of the fourth embodiment heretofore described in detail, the difference being that a circumferential lip or flange, similar to circumferential lip or flange 4.60 would be glued only to the first panel 7.32, and would not be secured between two panels.

Figure 28:
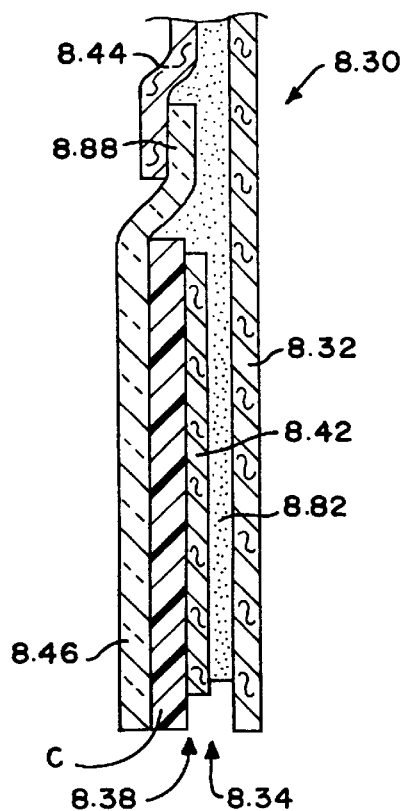
FIG. 28 is a partial sectional view of the eighth preferred embodiment of the present invention taken substantially along the line 28—28 of FIG. 26.
Figure 29:
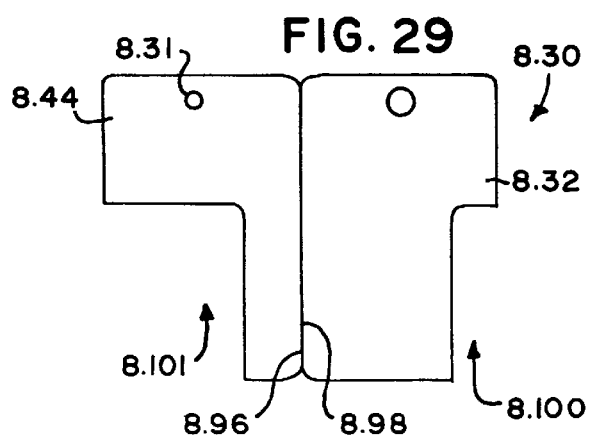
FIG. 29 is a view of the eighth preferred embodiment of the present invention before it has been assembled.

An eighth preferred embodiment is shown in FIGS. 26–29. FIG. 26 shows a front view, FIG. 27 shows a rear view, FIG. 28 shows an enlarged partial sectional view taken substantially along the line 28–28 of FIG. 26, and FIG. 29 shows an unassembled view. Identifying reference designators for the eighth embodiment are marked similarly to the other embodiments, except with the prefix "8.". It shall be understood that many aspects of all embodiments are substantially the same, and only the differences will be treated in detail, it being understood that similar structural features of all the embodiments perform similar functions.

The eighth preferred embodiment comprises a package 8.30 adapted for holding a first card C, and package 8.30 includes: a first panel 8.32, retaining means 8.34 for securing the first card C to the first panel 8.32 so that, when the first card C is secured to the first panel 8.32, at least a portion of the data-encoded strip S is exposed and laterally displaced remote, preferably external, from the first panel 8.32, and a second panel 8.44 adapted to be attached in substantial congruent alignment with the first panel 8.32. The second panel 8.44 is adapted to retain the first card C between the first and second panels 8.32 and 8.44 when the first card C is secured to the first panel 8.32. Printed material, such as advertisements, coupons, instructions, etc., may be located on the first panel 8.32 and/or the second panel 8.44. Like all embodiments, the eighth embodiment preferably has an opening 8.31 therethrough for hanging the package on a display rack in a retail store.

Referring to FIG. 27, the first panel 8.32 is adapted so that a first vertical side portion 8.90 of the first panel 8.32 has a first and a second vertical edge, 8.92 and 8.94, respectively, and is adapted so that, when the first card C is secured to the first panel 8.32, at least a portion of the data-encoded strip S is exposed and laterally displaced remote from the first vertical edge 8.92 of first panel 8.32. This configuration enables the eighth embodiment to be constructed with smaller dimensions than the dimensions of the other embodiments, for example, approximately 15.1 cm. high by 7.6 cm. wide, and therefore the package 8.30 consumes less space while being transported and while being displayed on a display rack in a retail store.

Preferably, the first and second panels 8.32 and 8.44 are formed as a single piece of cardboard folded in the middle along fold line 8.96 (see FIG. 29) so as to cause panels 8.32 and 8.44 to be hingedly attached to each other along a third vertical edge 8.98. Referring to FIG. 29, the first panel 8.32 has a first aperture or cut out portion 8.100 and the second panel 8.44 has a second aperture or cut-out portion 8.101, and each aperture or cut out portion, 8.100 and 8.101, preferably extends through the bottom edge of package 8.30. First and second aperture or cut-out portions, 8.100 and 8.101, are formed so that when the first panel 8.32 is substantially congruently attached to the second panel 8.44 as shown in FIGS. 26 and 27, the second aperture or cut-out portion 8.101 is just slightly larger than the width of the first card C, and the first aperture or cut-out portion 8.100 is sufficiently smaller than the width of the first card C so that one surface of the first card C, preferably the surface including the data-encoded strip S, can be secured to the first panel 8.32 in a manner substantially the same as described for the sixth embodiment. The first aperture or cut-out portion 8.100 must be large enough so that, when the first card C is secured to the first panel 8.32, at least a portion of the data-encoded strip S is exposed and externally laterally displaced from the first vertical edge 8.92 of the first panel 8.32 enabling the data-encoded strip S to be readable by a data-encoded strip reader 70 (see FIG. 18). The height of the first and second apertures or cut-out portions, 8.100 and 8.101, is just slightly larger than the height of the first card C. It should be understood that the orientation of the package 8.30 could be shifted so that the described vertical edges, sides and cooperating features could be in the horizontal direction.

Referring to FIGS. 26 and 28, the transparent window portion 8.46 is constructed similar to that previously described for the sixth embodiment, the significant difference being that the non-overlapping lip or flange portion 8.88 of the transparent window portion 8.46 extends between the first and second panels 8.32 and 8.44 only at the upper and left edges of the first card C. The transparent window portion 8.46 is otherwise attached to the first and second panels 8.32 and 8.44 in the same manner as described for the sixth embodiment. Package 8.30 preferably includes tamper evident means 8.38 including a sticker 8.42 which is similar in construction and operation as that described for the sixth embodiment. Retaining means 8.34 preferably includes glue 8.82 and sticker 8.42 which preferably has a heat-meltable glue coating on its exposed side remote from first card C, as described for the sixth embodiment. The construction and operation of retaining means 8.34 is substantially the same as that described for the sixth embodiment.

The first and second apertures or cut-out portions, 8.100 and 8.101, need not extend through the bottom edge of package 8.30, but could be formed at any vertical location along the height of package 8.30, for example, the first and second apertures or cut-out portions, 8.100 and 8.101, could be constructed so that the apertures or cut-portions, 8.100 and 8.101, do not extend through the bottom edge or through the top edge of package 8.30, and, in such a construction, the non-overlapping lip or flange portion 8.88 of the transparent window portion 8.46 would extend between the first and second panels 8.32 and 8.44 at the upper and left edges of the first card C, and in addition at the lower edge of the first card C.

Figure 30:
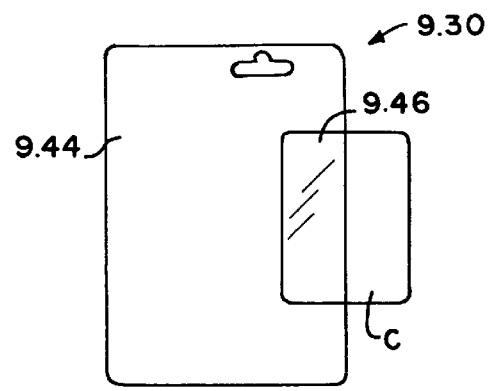
FIG. 30 is a front view of a ninth preferred embodiment of the present invention.
Figure 31:
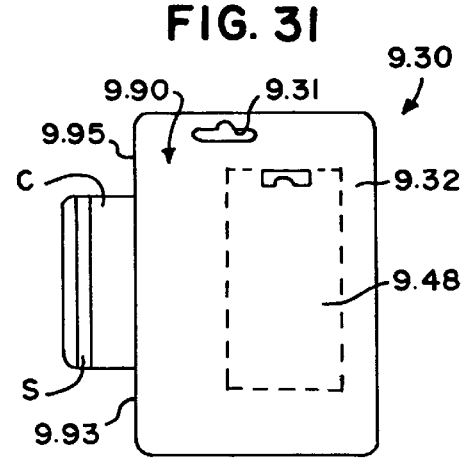
FIG. 31 is a rear view of the ninth preferred embodiment of the present invention.

A ninth preferred embodiment is shown in FIGS. 30 and 31. FIG. 30 shows a front view, and FIG. 31 shows a rear view. Identifying reference designators for the ninth embodiment are marked similarly to the other embodiments, except with the prefix "9.". It shall be understood that many aspects of all embodiments are substantially the same, and only the differences will be treated in detail, it being understood that similar structural features of all the embodiments perform similar functions.

The ninth preferred embodiment comprises a package 9.30 adapted for holding a first card C, and package 9.30 includes: a first panel 9.32, retaining means (not shown but similar to retaining means 6.34 of the sixth embodiment) for securing the first card C to the first panel 9.32 so that, when the first card C is secured to the first panel 9.32, at least a portion of the data-encoded strip S is exposed and laterally displaced remote, preferably external, from the first panel 9.32, and a second panel 9.44 adapted to be attached in congruent alignment with the first panel 9.32. The ninth preferred embodiment is constructed similarly to the sixth preferred embodiment, but has the following differences in construction.

Package 9.30 is adapted so that, when the first card C is secured to the first panel 9.32, at least a portion of the data-encoded strip S is exposed and laterally displaced remote, preferably external, from a first vertical side portion 9.90 of the first panel 9.32. Preferably, first and second panels 9.32 and 9.44 are formed as a single piece of cardboard folded in the middle so as to cause panels 9.32 and 9.44 to be hingedly attached to each other along first and second vertical edges 9.93 and 9.95. The first panel 9.32 preferably includes a door panel 9.48 having similar structure and functions as the door panel 6.48 described for the sixth preferred embodiment. The door panel 9.48 preferably has a lesser width than the door panel 6.48 of the sixth embodiment and is offset from the vertical center axis of the first panel so that there is enough space lateral to the door panel 9.48 to secure the first card C to the first panel 9.32 so that at least a portion of the data-encoded strip S is exposed and laterally displaced remote, preferably external, from the first vertical side portion 9.90 of the first panel 9.32.

The ninth preferred embodiment 9.30 preferably includes a transparent window portion 9.46 similar to that previously described for the sixth embodiment, except instead of being secured between the first and second panels 9.32 and 9.44 at the bottom of the package 9.30, the transparent window portion 9.46 is secured between the first and second panels 9.32 and 9.44 at the first vertical side 9.90. Retaining means and tamper evident means (both not shown) are substantially identical in structure and function to that described for the sixth preferred embodiment except for the change in location to secure the first card C to the first panel 9.32 so that at least a portion of the data-encoded strip S is exposed and laterally displaced remote, preferably external, from the first vertical side portion 9.90 of the first panel 9.32.

Like all embodiments, the ninth embodiment 9.30 preferably has an opening 9.31 therethrough for hanging the package on a display rack in a retail store, however, the location of opening 9.31 has been changed. When the first card C is secured to the first panel 9.32, the centroid is not located along the vertical center axis of the first panel 9.32 as with the other embodiments, instead the centroid is located along a vertical axis displaced towards the first vertical side portion 9.90. The location of opening 9.31 has been displaced to coincide with the displaced vertical axis of the centroid so that the combination of package 9.30 and first card C will hang level from the display rack.

It shall also be understood that the ninth embodiment could also be adapted to include a retaining portion, not shown, for holding at least one second card and preferably a plurality of second cards in a manner similar to retaining portion 4.56 of the fourth embodiment heretofore described in detail, and this would require relocation of the opening 9.31 so that the package 9.30 would hang level from the display rack.

Figure 32:
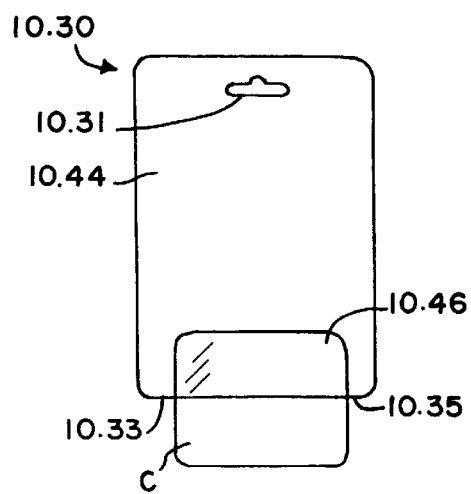
FIG. 32 is a front view of a tenth preferred embodiment of the present invention.

A tenth preferred embodiment is shown in FIGS. 32–36. FIG. 32 shows a front view, FIGS. 33, 35, and 36 show a rear view, and FIG. 34 shows a view of package 10.30 before assembly. Identifying reference designators for the tenth embodiment are marked similarly to the other embodiments, except with the prefix "10.". It shall be understood that many aspects of all embodiments are substantially the same, and only the differences will be treated in detail, it being understood that similar structural features of all the embodiments perform similar functions.

The tenth preferred embodiment comprises a package 10.30 adapted for holding a first card C, and package 10.30 includes: a first panel 10.32, retaining means (not shown but similar to retaining means 6.34 of the sixth embodiment) for securing the first card C to the first panel 10.32 so that, when the first card C is secured to the first panel 10.32, at least a portion of the data-encoded strip S is exposed and laterally displaced remote, preferably external, from the first panel 10.32, and a second panel 10.44 adapted to be attached in congruent alignment with the first panel 10.32. Preferably, first and second panels 10.32 and 10.44 are formed as a single piece of cardboard folded in the middle so as to cause panels 10.32 and 10.44 to be hingedly attached to each other along their left and right bottom edge portions 10.33 and 10.35 (see FIGS. 32 and 34). Referring to FIG. 33, the first panel 10.32 includes a first door panel 10.48 movably attached to the first panel 10.32. The first door panel 10.48 can be identically constructed and operated as that described for the sixth preferred embodiment, however, the preferred construction of the first door panel 10.48 differs somewhat from that described for the sixth embodiment. A hinge 10.52 is preferably constructed along the bottom edge of first door panel 10.48 and preferably includes multiple perforations 10.102. Unlike, the door panel 6.48 of the sixth embodiment, the first door panel 10.48 preferably does not include perforations along the length of the other three edges, but rather is unattached to the first panel 10.32 at the other three edges. A single perforation tooth 10.104 is preferably constructed at all four corners of the first door panel 10.48, and these four perforation teeth 10.104 together with hinge 10.52 secure the first door panel 10.48 to the first panel 10.32. The first door panel 10.48 includes a finger recess cutout 10.54 to assist in opening the first door panel 10.48 by permitting the insertion of a person's finger therewithin for better grip of the upper edge of the first door panel 10.48. The four perforation teeth 10.104 are constructed so that as the first door panel 10.48 is pulled downward, the four perforation teeth 10.104 will break to allow rotation of the first door panel 10.48 about the hinge 10.52. The first door panel 10.48 can remain hingeably attached to the first panel 10.32, or the first door panel 10.48 can be completely removed from the first panel 10.32 by tearing the multiple perforations 10.102 of the hinge 10.52.

Referring to FIG. 34, the second panel 10.44 includes a second and a third door panel 10.106 and 10.108, preferably constructed integral, one-piece with the second panel 10.44. The second door panel 10.106 is constructed to have two hinges, inner hinge 10.110 and outer hinge 10.112. During assembly of the package 10.30, the second door panel 10.106 is folded towards the interior of the second panel 10.44 at the inner hinge 10.110 so that the area of the second door panel 10.106 between the inner hinge 10.110 and the outer hinge 10.112 can be glued between the first and the second panels 10.32 and 10.44, when the first and second panels 10.32 and 10.34 are glued together in a manner similar to that described for the sixth preferred embodiment. It is important that the area of the second door panel 10.106 between the outer hinge 10.112 and the second door panel outer edge 10.114 is not glued so that the second door panel 10.106 will be movably attached to the package 10.30. The outer hinge 10.112 is preferably formed by perforations so that the second door panel 10.106 can remain hingeably attached to the first panel 10.32, alternatively the second door panel 10.106 can be completely removed from the first panel 10.32 by tearing the perforations of the outer hinge 10.112. The third door panel 10.108 is constructed to be a mirror image of the second door panel 10.106, and is likewise folded towards the interior of the second panel 10.44 and glued between the first and second panels 10.32 and 10.34.

FIG. 33 shows the package 10.30 with the first and second panels 10.32 and 10.44 glued together. To gain access to the second and third door panels 10.106 and 10.108, the first door panel 10.48 must first be opened using finger recess cutout 10.54. Referring to FIG. 35, once the first door panel 10.48 is opened, the second door panel 10.106 can be opened by rotating the second door panel 10.106 about it's outer hinge 10.112. Referring to FIGS. 35 and 36, after the second door panel 10.106 is opened, the third door panel 10.108 can be opened by rotating the third door panel 10.108 about it's outer hinge. It will now be apparent that the third door panel 10.108 could be opened before the second door panel 10.106 if the second door panel 10.106 is placed behind the third door panel 10.108 during assembly of the package 10.30.

Referring to FIG. 32, the tenth preferred embodiment 10.30 preferably includes a transparent window portion 10.46, retaining means (not shown but similar to retaining means 6.34 of the sixth embodiment), and tamper evident means (not shown but similar to tamper evident means 6.38 of the sixth embodiment) which are all are substantially identical in structure and function to that described for the sixth preferred embodiment. Like all embodiments, the tenth embodiment 10.30 has an opening 10.31 therethrough for hanging the package on a display rack in a retail store.

Now that various embodiments of the present invention have been described in detail, the method of the present invention, and its differences from the prior art, can now be explained and understood.

A metered account is associated with the secret PIN number on the card C, and anyone knowing the PIN number will be provided with goods or services, e.g., telephone services or other goods or services, having a value up to the amount of the certain predetermined balance. The certain predetermined balance will be debited for the amount of goods or services provided as they are purchased. The secret PIN is provided by selling card C having a PIN thereon, and the purchaser/cardholder causes transactions to be debited against the metered account by providing the PIN number to a merchant.

Prior art methods of providing the metered account associated with a card's PIN involve the activation and crediting of the metered account before the card is distributed to a retail merchant for resale. However, a prior art scheme using such pre-activated accounts necessarily requires that such cards be stored under lock and key by the retail merchant until the moment the cards are sold because, if the cards are stolen or the PIN numbers surreptitiously discovered, the pre-activated metered accounts can be drained of funds. The method of the present invention avoids such problems by not activating the metered account until the time of purchase of the card.

Referring to FIGS. 1–3 and 18, the first preferred method of the present invention uses a first card C having an exposed data-encoded strip S. The data-encoded strip is encoded with a unique first identification number comprising a "control number". The first card C also has a unique second identification number thereon, and this second identification number is the PIN P that allows access to the funds in a metered account. The method also uses a package 30 which includes a first panel 32 and retaining means 34 securing the first card C to the first panel 32 so that the data-encoded strip S is exposed and laterally displaced remote from the first panel 32. When the first card C is secured to the package 30, the PIN P is obscured from view. The package 30 preferably includes tamper evident means 38 or 38', heretofore described in various embodiments, to indicate when a surreptitious attempt to view the PIN P has been made. The control number and the PIN P are associated with a metered account. The control number is preferably a different number from the PIN P so that knowledge of the PIN P can not be obtained by reading the control number using a data-encoded strip reader 70 or by observing the exposed control number on card C.

A single company can manufacture the first card C and the package 30, secure the first card C to the package 30, and correlate, as, for example, by a correspondence table, the control number to the PIN P so that both numbers can be properly and uniquely associated with a metered account. Alternatively, one company can manufacture the package 30, and a second company can manufacture the first card C, then the second company or the provider of goods and services can secure the first card C to the package 30 and correlate the control number with the PIN P. Once the first card C is secured to the package 30 and the control number is correlated with the PIN P, the provider of goods or services can uniquely associate the control number and PIN P with a metered account. A representation of the control number, the PIN P, and the associated metered account are entered into a remote data processing apparatus, such as a digital computer 72 with attached data storage memory, in a manner well-known to those skilled in the art. Any well known computer programming technique, such as preferably a correspondence table, can be used to associate the control number and PIN P with a metered account as will now be apparent to those skilled in the art. The digital computer 72 can then be linked to data-encoded strip readers 70 located at many different retail stores so that, when a data-encoded strip S is read as the card and package combination is purchased, a characterization of the control number can be transmitted to the digital computer 72. Preferably, modems 74, 76 will be used to transmit the characterization of the control number over telephone lines, but any method of data transmission could be used, as will now be apparent to those skilled in the art. After the first card C is secured to the package, and the control number and PIN P are associated with a metered account within the digital computer 72, the first card C can be sent to a retail store for purchase by and distribution to the public.

Many first card C and package 30 combinations can then be openly stocked on the shelves or racks of a retail store. A customer can select a first card C and package 30 combination and bring the first card C and package 30 combination to a cashier or clerk. If the tamper evident means indicates that the PIN number may have been compromised, then the metered account corresponding to the tampered card should not be activated and another card and package combination should instead be purchased. After the customer has paid for the card and package combination, a clerk will then pass the data-encoded strip S through a data-encoded strip reader 70 to initiate the activation of the metered account for the just-purchased card.

Figure 18:
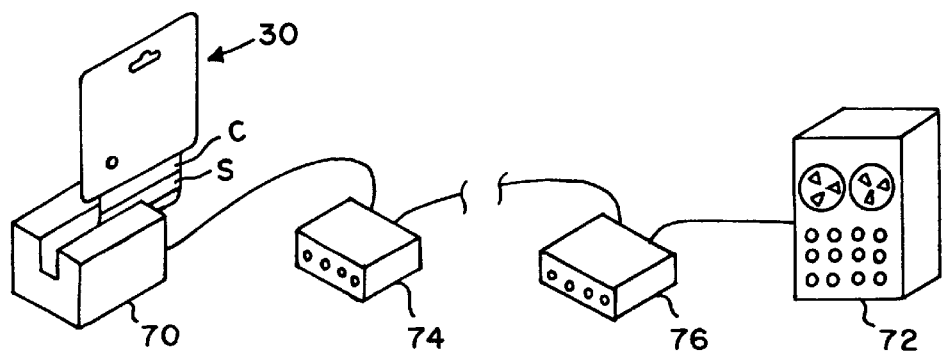
FIG. 18 is a somewhat schematic diagram showing the method of the present invention being used to activate a metered account.

Referring to FIG. 18, the control number is read from the data-encoded strip S by a data-encoded strip reader 70. A nearby modem 74, connected to the reader 70, transmits a characterization of this control number to a receiving modem 76 at the location of the digital computer 72. The receiving modem 76 is connected to the digital computer 72 and forwards the characterization of the control number to the digital computer 72. The digital computer 72 uses this characterization of the control number to identify the associated metered account in a manner now understood by those skilled in the art, and then activates that particular associated metered account. The metered account may have been credited with a certain predetermined balance when the metered account was entered into the digital computer 72, but, if not, the digital computer 72 will now credit the metered account with a certain predetermined balance.

The customer can now remove the first card C from the package 30 and store the first card C in any convenient place such as, for example, a wallet or purse. To obtain goods or services, e.g., to obtain telephone service, the cardholder customer could, for example, dial a certain telephone number and connect to the digital computer 72. The customer preferably then enters the PIN P onto the telephone keypad, but the PIN P could instead be entered into a personal computer which is connected to the digital computer 72 by modems or the PIN P could be entered using another well-known data entry device as will now be apparent to those skilled in the art. A characterization of the PIN P is then transmitted to the digital computer 72, the digital computer 72 uses the characterization of the PIN P to identify the associated metered account, the digital computer 72 provides the customer with access to goods or services, for example, telephone services, and the digital computer 72 then debits the balance of the metered account. When the balance has been debited to zero, goods or services can no longer be obtained by use of that particular PIN P and the first card C can be discarded.

A second preferred embodiment of the method of the present invention can be used to simultaneously activate a plurality of metered accounts, namely, a first metered account together with at least one second metered account, using the multi-card and package combination 4.30 heretofore described in detail as the fourth embodiment combination of the present invention.

Each particular PIN P on cards C, C' is associated with a different particular metered account, and each of the cards C, C' in the package 4.30 preferably has a different PIN from each other card in the package and also unique from every other card in every other package. A first identification number which comprises a unique control number is encoded onto the data-encoded strip S on the first card C. The control number is preferably a different number from any of the PINs P so that knowledge of any of the PINs P can not be obtained by surreptitious access to the control number.

A single company can manufacture the first card C, the second card(s) C', and the package 4.30, secure the first C and second C' cards to the package 4.30, and correlate the control number to the several PINs P within the package so that the control number and each particular PIN P can be properly and uniquely associated or correlated with a different particular metered account. Alternatively, one company could manufacture the package 4.30 and a second company could manufacture the first C and second C' cards. Then the second company or the provider of goods and services could secure the first C and second C' cards to the package 4.30 and correlate the control number with the plurality of PINs P on the cards C, C' within the package 4.30. Once the first C and second C' cards are secured to the package 4.30 and the control number is correlated with the several PINs P, the provider of goods or services can associate the control number with each different particular PIN P within the package, each different particular PIN P corresponding to a different particular metered account.

A representation of the control number, of each PIN P and of the metered account associated with each PIN P are entered into a remote data processing apparatus, such as a digital computer 72 with attached data storage memory, in a manner well-known to those skilled in the art. Any well known computer programming technique, such as preferably a correspondence table, can be used to associate the control number with the plurality of PIN and metered account pairs as will now be apparent to those skilled in the art. The digital computer 72 can be connected to data-encoded strip readers 70 located at many different retail stores so that, when a data-encoded strip S is read, a characterization of the control number will be transmitted to the digital computer 72. Preferably, modems 74, 76 will be used to transmit the characterization over telephone lines, but any method of data transmission can be used, as will now be apparent to those skilled in the art. After the first C and second C' cards are secured to the package 4.30 and the control number and each PIN P has been associated with a metered account within the digital computer 72, the package 4.30 can be sent to a store for purchase by and distribution to the public.

This second preferred method of the present invention activates the metered accounts upon purchase of the multi-card and package combination similarly to the first preferred method, heretofore described, except that the reading of the characterization of the control number from the data-encoded strip S is used to activate a plurality of different metered accounts, one for each card within the package 4.30, in a manner that will now be understood. It is the activation of the plurality of metered accounts, one for each card in the package 4.30, rather than the activation of only a single metered account, that is the substantial difference between the first and second preferred methods of the present invention.

After purchase of the multi-card and package combination 4.30 and activation of the plurality of metered accounts, a customer-purchaser could then remove the first card C and the one or more second cards C' from the package 4.30 and could then store the cards C, C' in one or more convenient places such as, for example, wallets or purses. The customer could retain the cards C, C' for personal use or could distribute any of the cards C, C' among family members, friends, or employees. To obtain goods or services, for example, to obtain telephone service, the possessor of a particular card uses that card in a manner similar to that heretofore described.

Although the present invention has been described and illustrated with respect to a preferred embodiment and a preferred use therefor, it is not to be so limited since modifications and changes can be made therein which are within the full intended scope of the invention.

We claim:

1. A package adapted for holding a first card, the first card generally defining a plane and having an exposed data-encoded strip; said package including:

(a) a first panel having an outer perimeter; and (b) retaining means for securing the first card to said first panel so that, when the first card is secured to said first panel, at least a portion of the data-encoded strip is exposed and displaced externally remote from a portion of said outer perimeter of said first panel in a direction substantially parallel to the plane of the first card.

2. The package of claim 1 in which said data-encoded strip comprises a magnetic strip.

3. The package of claim 1 in which said retaining means comprises a rivet.

4. The package of claim 3 in which the first card additionally has a personal identification number thereon, in which said rivet secures the first card to said first panel so that said personal identification number is obscured from view when the first card is secured to said first panel, and in which said rivet comprises tamper evident means for indicating that an attempt has been made to view the personal identification number when the first card is secured to said first panel.

5. The package of claim 1 in which the first card additionally has a personal identification number thereon, in which said retaining means secures the first card to said first panel so that said personal identification number is obscured from view when the first card is secured to said first panel, and in which said package comprises tamper evident means for indicating that an attempt has been made to view said personal identification number when the first card is secured to said first panel.

6. The package of claim 1 in which said package further includes a second panel adapted to be attached in congruent alignment with said first panel; said second panel adapted to retain the first card between said first and said second panels when the card is secured to the first panel.

7. The package of claim 6 in which said second panel comprises a transparent window portion positioned to overlap a portion of the first card remote from said data-encoded strip when the first card is secured to said first panel.

8. The package of claim 6 in which said first panel comprises a door panel movably attached to said first panel.

9. The package of claim 6 in which said second panel further comprises a retaining portion adapted to secure at least one second card to said package so that the at least one second card is laterally displaced from the first card.

10. The package of claim 1 in which said package further includes a second panel adapted to be attached in congruent alignment to said first panel and adapted to entrap a third panel between said first and second panels; said second panel having window means for viewing the third panel therethrough.

11. The package of claim 10 in which said retaining means comprises a rivet.

12. In combination:

a first card generally defining a plane and including an exposed data-encoded strip; and a package including a first panel, said first panel having an outer perimeter; said first card being secured to said first panel so that at least a portion of said data-encoded strip is exposed and displaced externally remote from a portion of said outer perimeter of said first panel in a direction substantially parallel to the plane of said first card.

13. The combination as recited in claim 12 in which said data-encoded strip comprises a magnetic strip.

14. The combination as recited in claim 12 in which said first card is secured to said first panel by a rivet.

15. The combination as recited in claim 14 in which said first card has a personal identification number thereon, in which said rivet secures said first card to said first panel so that said personal identification number is obscured from view, and in which said rivet comprises tamper evident means for indicating that an attempt has been made to view said personal identification number.

16. The combination as recited in claim 12 in which said first card has a personal identification number thereon and said first card is secured to said first panel so that said personal identification number is obscured from view, and in which said package comprises tamper evident means for indicating that an attempt has been made to view said personal identification number.

17. The combination as recited in claim 12 in which said package further includes a second panel attached in congruent alignment with said first panel; said second panel retaining said first card between said first and second panels.

18. The combination as recited in claim 17 in which said second panel comprises a transparent window portion overlapping a portion of said first card remote from said data-encoded strip.

19. The combination as recited in claim 17 in which said first panel comprises a door panel movably attached to said first panel.

20. The combination as recited in claim 17 in which said second panel further comprises a retaining portion securing at least one second card to said package so that said at least one second card is laterally displaced from said first card.

21. The combination as recited in claim 12 in which said package further includes a second panel in congruent alignment with said first panel and entrapping a third panel between said first and second panels; said second panel having window means for viewing said third panel therethrough.

22. The combination as recited in claim 21 in which said first card is secured to said first panel by a rivet.

23. The combination as recited in claim 21 in which said first card has a personal identification number thereon and in which said package further includes cover means attached to said first card for hiding said personal identification number from view.

24. In combination:
a first card generally defining a plane and including an exposed data-encoded strip;
at least one second card; and
a package including:
a first panel having an outer perimeter; said first card being secured to said first panel so that at least a portion of said data-encoded strip is exposed and displaced remote from a portion of said outer perimeter of said first panel in a direction substantially parallel to the plane of said first card; and
a retaining portion securing said at least one second card to said package so that said at least one second card is displaced from said first card.

25. In combination:
a card having a personal identification number thereon, said card generally defining a plane and including an exposed magnetic strip; and
a package including:
a first panel;
a second panel attached in congruent alignment to said first panel and comprising a transparent window portion overlapping a portion of said card remote from said magnetic strip; and
a rivet extending between said first and second panels securing said card to said first and second panels so that at least a portion of said magnetic strip is exposed and laterally displaced remote from said first and said second panels in a direction substantially parallel to the plane of said card; said rivet being adapted to indicate that an attempt has been made to view said personal identification number.

26. In combination:
a card having a personal identification number thereon, said card generally defining a plane and including an exposed magnetic strip; and
a package including:
a first panel;

a door panel hingedly attached to said first panel;
a second panel attached in congruent alignment to said first panel and comprising a transparent window portion overlapping a portion of said card remote from said magnetic strip; and
a rivet extending between said first and second panels securing said card to said first and second panels so that at least a portion of said magnetic strip is exposed and laterally displaced remote from said first and said second panels in a direction substantially parallel to the plane of said card; said rivet being adapted to indicate that an attempt has been made to view said personal identification number.

27. In combination:
a first card having a personal identification number thereon, said first card generally defining a plane and including an exposed magnetic strip; and
at least one second card; and
a package including:
a first panel;
a second panel attached in congruent alignment to said first panel; said second panel having a compartment holding said at least one second card to said package; and
a rivet extending through said first card and securing said first card to said package so that at least a portion of said magnetic strip is exposed and laterally displaced remote from said first and said second panels in a direction substantially parallel to the plane of said first card; said rivet being adapted to indicate that an attempt has been made to view said personal identification number.

28. In combination:
a card having a personal identification number thereon, said card generally defining a plane and including an exposed magnetic strip; and
a package including:
a sticker attached to said card hiding said personal identification number from view;
a first panel including a male protuberance and having a first end;
a second panel including a female protuberance in mating engagement with said male protuberance; and
a third panel;
said second panel retaining said card and said third panel between said first and second panels and including a transparent first window portion overlapping at least a portion of said card remote from said magnetic strip; said second panel being attached in congruent alignment to said first panel; said second panel having a second end hingedly attached to said first end and a second window portion for viewing said third panel therethrough; and
a rivet extending between said first and second panels for securing said card to said first and second panels so that said magnetic strip is exposed and laterally displaced remote from said panels in a direction substantially parallel to the plane of said card.

29. A method of using the first card and package combination as recited in claim 12 to activate a metered account, said method comprising the steps of:
(a) encoding a first identification number onto said data-encoded strip;
(b) associating a first representation of said first identification number with said metered account within a processing apparatus;

i. then using a data-encoded strip reader to read said encoded first identification number from said exposed data-encoded strip while said first card is secured to said first panel;

ii. then transmitting a first characterization of said first identification number from said data-encoded strip reader to said processing apparatus;

iii. then using said first characterization of said first identification number to identify said metered account by said processing apparatus;

iv. then activating said metered account by said processing apparatus;

and (c) crediting said metered account with a certain predetermined balance.

30. The method of claim 29 which further comprises the steps of:

(a) associating a second representation of a second identification number with said metered account within said processing apparatus; then (b) using a second characterization of said second identification number to identify said metered account by said processing apparatus; and then (c) providing access to services and debiting said balance of said metered account for said providing of said services.

31. A method of using the first card, at least one second card and package combination as recited in claim 24 to activate a plurality of metered accounts, said method comprising the steps of:

(a) encoding a first identification number onto said data-encoded strip;

(b) associating a first representation of said first identification number with said plurality of said metered accounts within a processing apparatus;

i. then using a data-encoded strip reader to read said encoded first identification number from said exposed data-encoded strip while said first card is secured to said first panel;

ii. then transmitting a first characterization of said first identification number from said data-encoded strip reader to said processing apparatus;

iii. then using said first characterization of said first identification number to identify said plurality of said metered accounts by said processing apparatus;

iv. then activating said plurality of said metered accounts by said processing apparatus;

and (c) crediting each said metered account with a certain predetermined balance.

32. The method of claim 31 which further comprises the steps of:

(a) associating a second representation of a second identification number with one particular metered account of said plurality of said metered accounts within said processing apparatus; then (b) using a second characterization of said second identification number to identify said particular metered account by said processing apparatus; and then (c) providing access to services and debiting said balance of said particular metered account for said providing of said services.

33. The combination as recited in claim 16, in which said package further includes a second panel attached in congruent alignment with said first panel; said tamper evident means comprising a sticker affixed to said first card and obscuring said personal identification number from view; said first card being secured to said first panel by a glue bonding said sticker to said first panel.

34. The combination as recited in claim 33, in which said second panel comprises a transparent window portion overlapping a portion of said first card remote from said data-encoded strip.

35. A method of using a card-and-package combination to activate a metered account, said card-and-package combination comprising a package and a first card generally defining a plane; said first card including a data-encoded strip and said first card additionally having a personal identification number thereon; said first card being secured to said package so that said personal identification number is obscured from view and so that at least a portion of said data-encoded strip is exposed; said method comprising the steps of:

(a) encoding a first identification number onto said data-encoded strip;

(b) associating a first representation of said first identification number with said metered account within a processing apparatus;

i. then using a data-encoded strip reader to read said encoded first identification number from said exposed data-encoded strip while said first card is secured to said first panel;

ii. then transmitting a first characterization of said first identification number from said data-encoded strip reader to said processing apparatus;

iii. then using said first characterization of said first identification number to identify said metered account by said processing apparatus;

iv. then activating said metered account by said processing apparatus;

and (c) crediting said metered account with a certain predetermined balance.

36. The method of claim 35 which further comprises the steps of:

(a) associating a second representation of a second identification number with said metered account within said processing apparatus; then (b) using a second characterization of said second identification number to identify said metered account by said processing apparatus; and then (c) providing access to services and debiting said balance of said metered account for said providing of said services.

37. A method of using a card-and-package combination to activate a plurality of metered accounts, said card-and-package combination comprising:

(A) a first card generally defining a plane; said first card including a data-encoded strip and said first card additionally having a personal identification number thereon;

(B) at least one second card; and (C) a package; said first card being secured to said package so that said personal identification number is obscured from view and so that at least a portion of said data-encoded strip is exposed; said package including a retaining portion securing said at least one second card to said package;

said method comprising the steps of:

(a) encoding a first identification number onto said data-encoded strip;

(b) associating a first representation of said first identification number with said plurality of said metered accounts within a processing apparatus;
  i. then using a data-encoded strip reader to read said encoded first identification number from said exposed data-encoded strip while said first card is secured to said first panel;
  ii. then transmitting a first characterization of said first identification number from said data-encoded strip reader to said processing apparatus;
  iii. then using said first characterization of said first identification number to identify said plurality of said metered accounts by said processing apparatus;
  iv. then activating said plurality of said metered accounts by said processing apparatus;

and (c) crediting each said metered account with a certain predetermined balance.

38. The method of claim 37 which further comprises the steps of:
  (a) associating a second representation of a second identification number with one particular metered account of said plurality of said metered accounts within said processing apparatus; then
  (b) using a second characterization of said second identification number to identify said particular metered account by said processing apparatus; and then
  (c) providing access to services and debiting said balance of said particular metered account for said providing of said services.

* * * * *